United States Patent [19]

Larsson et al.

[11] Patent Number: 5,094,545
[45] Date of Patent: Mar. 10, 1992

[54] URINE TEMPERATURE MEASURING DEVICE

[75] Inventors: Raymond P. Larsson, Denville; George T. Levendusky, Bayonne, both of N.J.

[73] Assignee: Pyma Corporation, Somerville, N.J.

[21] Appl. No.: 590,160

[22] Filed: Sep. 28, 1990

[51] Int. Cl.⁵ .................. G01K 11/06; G01K 11/12; G01K 11/16

[52] U.S. Cl. .................. 374/160; 374/162; 252/962; 252/408.1; 116/217

[58] Field of Search .............. 374/160, 161, 162; 116/216, 217, 207; 252/962, 408.1

[56] References Cited

U.S. PATENT DOCUMENTS

| | | | |
|---|---|---|---|
| 3,956,153 | 5/1976 | Chadha | 374/162 |
| 3,980,581 | 9/1976 | Godsey, Jr. et al. | 374/162 |
| 3,998,098 | 12/1976 | Chilton | 374/155 |
| 4,150,572 | 4/1979 | Lindquist | 374/160 |
| 4,232,552 | 11/1980 | Hof et al. | 374/162 |
| 4,248,089 | 2/1981 | Heinmetz | 374/162 |
| 4,339,207 | 7/1982 | Hof et al. | 374/160 |
| 4,362,645 | 12/1982 | Hof et al. | 374/160 |
| 4,397,570 | 8/1983 | Hof et al. | 374/162 |
| 4,457,252 | 7/1984 | Manske | 374/160 |
| 4,457,253 | 7/1984 | Manske | 374/160 |

Primary Examiner—William A. Cuchlinski, Jr.
Assistant Examiner—Diego F. F. Gutierrez
Attorney, Agent, or Firm—Anthony Lagani, Jr.

[57] ABSTRACT

A temperature measuring device useful for measuring the temperature of urine samples is disclosed comprising a solid solution having incorporated therein a nucleating agent and an indicating dye system. The preferred solid solution is a mixture of ortho-chloronitrobenzene and ortho-bromonitrobenzene. The preferred dye systems are pinacyanol iodide and a mixture of bromcresol purple and ethyl red. A novel aspect of the thermometer is that it is adapted to indicate a predetermined temperature at an observable initiation of melt temperature which is about 0.3° to about 1.9° F. below the completion of melt temperature of the composition. The thermometer is a real time device.

17 Claims, 5 Drawing Sheets 5,094,545

URINE TEMPERATURE MEASURING DEVICE

FIELD OF THE INVENTION

This invention relates to a device suitable for measuring the temperature of urine prior to testing for drugs. In particular it relates to a chemical type device of the type disclosed in U.S. Pat. No. 4,232,552.

BACKGROUND OF THE INVENTION

Chemical type thermometers are well known in the art. These devices rely on the melting point of a temperature sensitive composition in order to indicate temperature. See for example U.S. Pat. No. 3,946,612, incorporated herein by reference, which discloses the use of a binary mixture of ortho-chloronitrobenzene and ortho-bromonitrobenzene which form a solid solution as the temperature sensitive indicting composition.

An improved version of the '612 chemical thermometer is disclosed in U.S. Pat. No. 4,232,552, incorporated herein by reference. The improvement disclosed in the '552 patent includes the discovery that certain dyes or combinations of dyes can cause the temperature indicating composition to change color in a reversible manner when it goes from the solid state to the liquid state, or the liquid state to the solid state.

While the clinical thermometer of the '552 patent relies on supercooling for its operation, the use of a nucleating agent to prevent supercooling is disclosed. The use of nucleating agents in the binary system of the '552 patent is disclosed in the Godsey U.S. Pat. No. 3,980,581, Chada U.S. Pat. Nos. 3,712,141, and 3,956,153, all of which are incorporated herein by reference.

Because the binary mixtures of ortho-chloronitrobeneze and ortho-bromonitrobeneze have a 2° F. melting point range, and it is desired to have a clinical temperature reading in about one minute, it is necessary to offset the actual temperature reading and the indicated temperature of the '612 and '552 clinical devices. Hence, the melting point of the a particular temperature indicating composition is different from that shown for the pocket in which it is located. In the prior art clinical devices of the '612 and '552 patents the offset is minus 0.6° F. For example, where the device of the '612 patent indicates a temperature of 98.6° F., the chemical composition in the pocket labeled 98.6 has an initial melting point temperature of 98.0° F. and melts over the range of 98.0° to 100.0° F. However, the device of the '552 patent operates on a completion of melt reading. Therefore, the composition in the 98.6° F. pocket has a completion of melt temperature of 98.0° F., and melts over the temperature range 96.0° to 98.0° F. The result is that in a water bath the equilibrium temperature which is read is a temperature other than the bath temperature.

While this offset permits a rapid accurate reading for clinical devices for oral temperature indications, it is not adequate for all purposes. If the device of the '612 or '552 patent are used to measure the urine temperature, the result is an inaccurate temperature not only because of the offset used, but because the composition has a two degree melting point range.

The device of the '612 patent which operated on an initiation of melt temperature suffered from a difficulty in reading "partial" melts as being indicative of a temperature of the subject. Depending on the experience and judgment of the user different temperature readings could be obtained for the same actual temperature.

Where drug testing by urinalysis is mandated, it is necessary to confirm that the urine sample is a fresh sample of the individual to be tested. This is accomplished by measuring the temperature of the urine sample within four minutes of the taking of the sample. The temperature of the sample must be between 90.5° and 99.8° F. If it is not, there is reason to believe that the individual being tested may have altered or substituted the specimen. See the Federal Register, Part IV, Vol. 53, N. 69, page 11980, Apr. 11, 1988 incorporated herein by reference. The temperature reading must be a real time temperature. That is, the temperature observed must properly read the actual temperature, and change in response to changes in the urine temperature with time.

SUMMARY OF THE INVENTION

It has surprisingly been found that a device suitable for use in measuring urine sample temperature can be made using the temperature indicating compositions of the '552 patent and an initiation of melt reading. Surprisingly this same device can be used as a clinical thermometer for axillary temperature measurements.

DETAILED DESCRIPTION OF THE INVENTION

Figure 1:
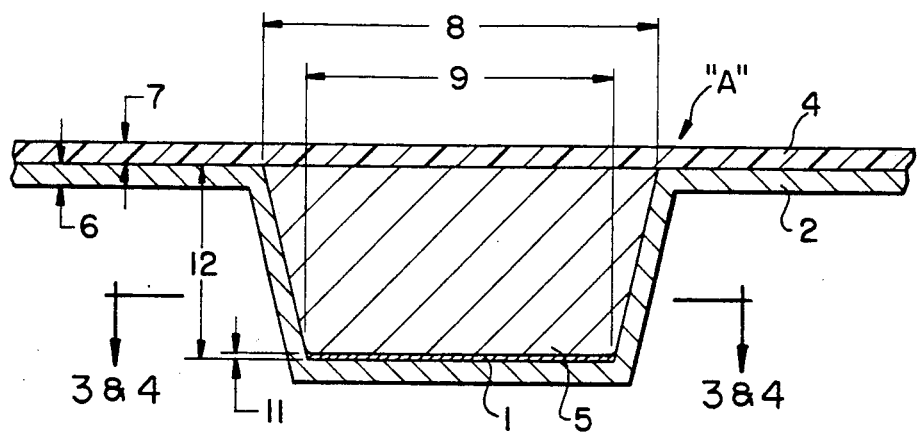
FIG. 1 is a partial plan view from the horizontal of a flat or graduated curved prior art heat-conducting carrier having a cavity defined therein, which cavity forms an enclosure for a temperature-sensitive "classical" composition of matter therein when such cavity is covered by a transparent cover sheet means in sealing engagement with the carrier means overlying the heat-conducting carrier means and above the cavity; the figure also depicts a substantially spherical cavity inside the temperature-sensitive composition of matter.

Hof et al, U.S. Pat. No. 4,232,552, incorporated herein by reference, discloses that certain organic dyes can be utilized to display a color change at a predetermined temperature. For a complete understanding of the operation of the device of this invention so much of the '552 patent as is required has been reproduced verbatim below.

Throughout the Detailed Description below, the terms "novel thermally-responsive substance", "novel thermally-responsive material", "novel temperature-indicting compositions of matter", "novel temperature-sensitive solid solutions", "novel temperature-indicating solid solutions", and "novel solid solutions", or variations thereof, are used interchangeably to denote the same novel materials of the '552 patent.

1. Compositions of Matter

The discovery disclosed in the Hof et al '552 patent is that certain organic compounds (to be described hereinafter) form novel solid solutions which undergo a change in state from solid to liquid at precise and predetermined temperatures with a corresponding change in color visible to the naked eye, and likewise, from liquid solutions which undergo a change in state from liquid to solid at precise and predetermined temperatures with a corresponding change in color visible to the naked eye. The term "solid solution" is well known and usually refers to a homogeneous solution of one solid in another. The novel solid solutions contemplated in the present invention are composed of two or more, preferably three or four, different organic compounds with varying proportions of at least two compounds which form a solvent for the solution. Each novel solid solution undergoes a rapid change of state at a precise and predetermined temperature or substantially thereabouts. By a "change in color visible to the naked eye" of a source we mean a change in the wavelength of luminous flux of light (from the source distributing or reflecting such energy in the region of the Electromagnetic Spectrum from about 3900 Angstrom units to about 7600 Angstrom units before or after the change, or preferably both) visible to a person of normal vision and eyesight wherein the intensity of the luminous flux surrounding the source is more than or about 5 lumens per square food (ft-c). in most instances, this change in the wavelength of luminous flux to the eye will be at least about 175 Angstroms, and preferably at least about 500 Angstroms.

Preferably, when a small but effective amount (generally a weight fraction from about 0.005 to 0.2 weight percent, and generally about 0.05 weight percent of the entire composition, but the optimum may be more or less upon experimentation, depending on the Group I-III (described below) compounds selected and the solvent (solid solution) selected, one or more of Group III compounds: pinacyanol iodide, 1,1'-diethyl-2,2'-cyanine iodide, quinaldine red, pinacyanol chloride, thionin, methylene blue, cresol red, chlorophenol red, neutral red iodide, neutral red chloride, crystal violet, acridin orange, Orasol Orange RLN TM, Orasol Navy Blue TM, Irgalith Red PR TM, Fat REd BS TM, Xylene Cyanol FF TM, Rhodamine B, Rhodamine 6G TM, Irgalith Magenta TCB TM, Irgalith Pink TYNC TM, Toluidin Blue O TM, Savinyl Green B, Savinyl Blue RS TM, purpurin, 3,3''-diethylthiadicarbocyanine iodide, cryptocyanine, Dicyanine A TM, Merocyanine 540 TM, 4-(p-ethoxyphenylazo)-m-phenylene diamine monohydrochloride, Yellow Orange S TM, Chrysoidin G TM, fuchsin, aurintricarboxylic acid (ammonium salt), Victoria Blue R TM, Pyronin G TM, gallein, Erythrosin Yellowish Blend TM, chlorophenol blue, bromophenol blue, bromocresol purple, Coriphospine O TM, acriflavin, acridine orange, rhoduline violet, Alizarin cyanin 2, R. TM, Alizarin Red S TM, alcannin Aurantia TM, Direct Green G TM, Fast Red Salt 3GL TM, Fast Blue Salt BB TM, Fast Garnet Salt GBC TM, Carta Yellow G 180 o/o Murexide, Savinly Blue GLS TM, Irgalith Blue GLSM TM, phthalocyanine, Di Amingreen B TM, Alizarin Blue S, Celiton Blue Extra TM, neocyanine, Janus Green TM, dimethyl yellow, Fast Yellow, Methyl red sodium salt, Alizarin yellow R TM, Eriochrome black T TM, Chromotrope 2R TM, Ponceau 6R TM, Brilliant Ponceau G/R/2R TM, chromolan yellow, Sudan red B TM, Bismarck brown G TM, Fat Black TM, Resorcin Brown TM, Benzofast pink 2 BL TM, Oil Red EGN TM, Euroglaucine, Fuchsin NB TM, parafuchsin, Patent Blue TM, Irgalith Blue TNC TM, Phloxin B TM, fluorescein sodium salt, Rhodamine B base TM, Eosinscarlet, Eosin Yellowish TM, Erythrosin extrabluish, 4,5-dibromofluoroscein, ethyleosin, Phloxine TM, Cyanosin B TM, chlorocresol green, pinacyanol bromide, 2-(p-dimethylaminostyryl)-1-ethyl pyridinium iodide, ethyl pyridinium iodide, ethyl red, nigrosine, savinyl blue B TM, Orasol Blue BLN TM, Safranin O TM, Solophenyl Brilliant Blue BL TM, Nile Blue A TM, gallocyanine, gallamine blue celestine blue, methylene green, Azure A/B/C TM, Blue VIF TM Organol TM, Alizarin, Nitrofast Green GSB TM, quinalizarine, Oil Blue N TM, Solvay purple, Ciba Blue TM, Indigo synthetic TM, Chromophtal Bordeaux RS TM, Acid Alizarin Red B TM, 5-Aminofluorescein, Rose Bengal TM, Martius Yellow TM, Chicago Blue 6B TM, Alcian blue 8GX TM, cresyl violet, 4,4'-Bis(-dimethylamino)benzylhdrol, Zinc Pthalocyanine, Sudan III TM, Pyronin Y TM, Toluylene Blue TM, Cresyl Violet perchlorate, Mendola's Blue TM, 3,3'-diethylthiadicarbocyanine iodide, Phosphine Dye TM, Nitron TM, cresyl violet acetate, Ceres Orange R TM, 4-phenylazo-1-naphtylamine, 4-(4-Dimethylamino-1-naphtylazo-3-methoxybenzene sulfonic acid, Bindschedler's Green TM, and p-(p-dimethylaminophenylazo)benzoic acid, or one of the other organic moieties to be described (one or more Group I compounds with one or more Group II compounds) is combined with a suitable solvent, for example, a pure mixture of ortho-chloronitrobenzene and orthobromonitrobenzene for use in clinical applications, the temperature of the change of state of a number of solid solutions with a corresponding change in color may be accomplished at approximately $1/10°$ C. or $2/10°$ F. intervals, i.e., a change of state of one novel temperature-sensitive composition of matter at a temperature $1/10°$ C. or $1/5°$ F. different from the temperature of change in state of another novel composition of matter in an adjacent region containing another proportion of the same organic moieties in ortho-chloronitrobenzene and ortho-bromonitrobenzene. Thus, for example, in human clinical applications where temperature measurements in the range of 96° F. to 105° F. (or from 35.5° C. to 40.5° C.) are usually desired, 45 to 50 different solid solutions differing in their percentage compositions but otherwise made from the same two components) will provide all of the necessary temperature gradations at increments of $1/10°$ F., i.e., 96.0°, 96.2°, 96.4°, etc., up and including 104.8° F., or in the alternative 35.5°, 35.6°, 35.7°, up and including 40.4° C. The solution of ortho-chloronitrobenzene and ortho-bromonitrobenzene, when the ortho-bromonitrobenzene varies from 56.2 weight percent to 96.0 weight percent, provides an excellent starting mixture for determination of temperatures in the human clinical temperature range. Usually the addition of the group I-III organic moieties (hereinafter sometimes "organic moieties") consisting of a small but effective percentage of one or more of the aforesaid Group III compounds, or a combination of one or more Group I compounds with one or more Group II compounds affects the temperature curve in FIG. 1 by only a small increment e or ë, which is substantially constant along the entire curve. Regardless of the solvent system selected for a given predetermined temperature range, it is necessary that the organic moieties selected for the color change constitute a small but effective amount of moieties, e.g., at least that amount sufficient to provoke a color change visible to the naked eye, and preferably up to a saturated solution of Group I-III organic moieties, and most preferably about 0.005 to about 0.2 weight percent of an inert, preferably aromatic solvent constituents, constituting the remaining balance of the mixture. The Group I-Group III moieties may in some instance exceed 0.2 weight percent as long as the melting point remains sharp and both phases are not so dark as to eliminate a color change visible to the naked eye. If too small an amount of organic moieties is employed, the colors and the color change are too faint under weak light; if too large an amount is employed, the colors are too dark and the color change is harder to visualize and there is a possibility that the sharpness of the melting point will be affected. It is also noted that the organic moieties and suitable solvent to be described should be substantially free of impurities. Generally, such impurities should be kept less than three tenths of one percent of the entire composition. Supersaturated solutions are not preferred for reasons to be enumerated below.

The dye systems (organic moieties) of the '552 patent are useful in the practice of this invention are incorporated into the solid solution at a preferred concentration of about 0.03 wt. % based of the weight of the solid solution plus organic moiety; more preferably at about 0.035 to about 0,1 wt. %.

It must be emphasized from the outset that once a proposed solvent system has been selected (consisting of one or more compounds) for the temperature(s) to be determined, the compound(s) of the system must be tested for the Group I-III moieties for stability (i.e., inertness) and Group I-III moieties are soluble in the compound(s) of the solvent. This must be done by routine testing within the skill of those in the art. Only after the solvent system compound(s) are shown to dissolve the Group I-III moieties and be inert towards them, can such a solvent system be suitable for our invention.

Those skilled in the art will appreciate that organic compounds, unlike crystalline materials, exhibit a melting point range rather than a sharp and distinct melting point. For example the OCNB and OBNB exhibit a melting point range of about 2° F. Temperature readings within about 0.2° F. or 0.1° C. are achieved by selecting completion of melt temperature differentiated from one another by the incremental reading desired.

While sometimes under fortuitous circumstances the solvent system may consist of only one compound, in most instances (as those skilled in the art will appreciate) the temperature to be determined will not readily be obtainable without mixing two or more organic compounds for the solvent system. Hence, for a temperature-indicating device, two or more related organic compound constituents in the solvent are especially helpful for measuring forty or more temperatures located at regular increments.

It is apparent from the foregoing description that the selection of one or more inert solvents towards the organic moieties for use in the novel composition of matter requires judicious and careful scrutiny, since not all organic compounds are useful for this purpose and many may fall outside a desired temperature range. A suitable solvent may be any solvent which is inert towards the organic moieties and in which the organic moieties are soluble while the solvent is in the liquid phase. In some instances, simple alcohols and other organic substances may be suitable rather than aromatic compounds. The organic compounds which are particularly adapted for the formations of solid solutions which can serve a novel temperature-indicating composition in accordance with the present invention are generally those which are weakly polar (e.g., compounds which are immiscible in water and have a dielectric constant less than about 35) or moderately polar aromatic organic compounds, as well as the requirements of organic moiety solubility and inertness towards the organic moieties. Thus, it has been discovered that weakly polar or moderately polar aromatic organic compounds, which have analogous chemical structures (e.g., analogs, homologs and optical isomers), have substantially the same molecular volume or have similar crystalline structures (e.g., isomorphous) and which form the novel solid solutions useful for the purpose of this invention are especially useful for solvent system constituents in preparing a grid of novel composition of matter to be used in predetermined temperature range for the determination of a temperature falling within said range. In addition, it is preferable that the solvent solutions have a linear or a substantially linear temperature composition liquidous curve, particularly over the desired temperature range such as, for example, over the human clinical temperature range. Exemplary weakly polar or nonpolar aromatic solvents are ortho-chloronitrobenzene, ortho-bromonitrobenzene, naphthalene, 2-ethoxybenzamide, 1-thymol, 2-naphthol, ortho-iodonitrobenzene, meta-iodonitrobenzene, parai-odonitrobenzene, para-dibromonitrobenzene and para-toluic acid. It must be emphasized, of course, that a suitable solvent useful for one selection of organic moieties may not be useful for another, and that an operable solvent at one temperature range may not work at a different range. It is recommended that for a given temperature to be measured, one may start his investigation for the appropriate temperature(s) to be determined a suitable solvent system selected from compounds from the following:

(1) moderately polar or weakly polar aromatic compounds, i.e., compounds having a dielectric constant of less than about 35;

(2) water; or (3) aromatic and aliphatic compounds other than (1) or (2) which are germane to the temperatures to be determined, and which are "inert" to the Group I-III dyes.

The constituents of the novel compositions of matter comprise:

(1) a solvent (I) consisting of a single substance or a mixture of substances and adapted to change from a solid state at substantially a predetermined temperature to a liquid state and (2) an indicator system (II) consisting of one or more substances different from (I), characterized in that (a) (II) is soluble in (I) when the latter is in the liquid phase, and (b) (II) changes color visible to the naked eye when (I) passes from the solid to the liquid phase or from the liquid to the solid phase.

It is well within the range of knowledge of those skilled in the art to find for a given temperature range to be measured, and for color change desired (choosing from the various Group I–III compounds) a suitable solvent, i.e., one which is in the Group I–III compounds and for which the latter is soluble in the liquid phase of said solvent. The term "organic moiety" as used in the specification and claims means the Group I-III compounds as herein described.

The solid solutions made from ortho-chloronitrobenzene (OCNB) and ortho-bromonitrobenzene (OBNB) have been found to be most preferable for use in temperature measurements in the clinical range within the aforesaid accuracy. Of course, as it will be readily understood by those skilled in the art, any two or more aromatic solvents as defined above in which the organic moieties to be described below are soluble, stable and inert, may be employed for thermometers if adaptable to the temperature range to be tested, and if capable together of forming a homogeneous solid solution.

Preferably the novel composition of matter consists essentially of:

(A) a suitable solvent adapted to change from a solid state at a predetermined temperature to a liquid state, and (B) an effective amount of one or more suitable organic moieties soluble in said solvent in the liquid state and adapted to change the color of the composition visible to the naked eye upon the change of state of the solvent at substantially the predetermined temperature and selected from one or more of the group consisting of (1) a Group III body of single compounds consisting of the cyanine class of dyes, suitable dyes from the following classes: monoazo, diazo, triarylmethane, xanthene, sulphonephthalein, acridul, quinoline, azine, oxazine, thiazine, anthraquinone, indigold, and the following individual compounds: Aurantia TM, Orasol orange RLN TM, Diamin green B TM, Direct green G TM, Fast red salt 3 GL TM, Fast blue salt BB TM, Fast Garnet salt GBC TM, Carta Yellow G 180 o/o TM, Murexide, Savinyl blue GLS, Irgalith blue GLSM $, Phthalocyanine and Alcannin;

(2) mixtures of
  (a) one or more organic acids compounds, having a pK of less than about four, and (3) mixtures of
  (a) one or more organic acids having a pK of less than about 2, and
  (b) one or more acid dyes or acid indicators;

(4) mixtures of
  (a) one or more organic acid compounds having a pK of less than about 4, and
  (b) one or more members of the Group I body of compounds;

(5) mixtures of
  (a) one or more basic dyes or basic indicators and
  (b) one or more members of the Group I body of compounds, (6) mixtures of
  (a) one or more dyes having a molecular structure containing a lactone group, and
  (b) one or more acids having a pK of about 8 to about 12.

The compounds mentioned in Group III are classified according to the *Colour Index*, 3rd Edition (1971), published by the Society of Dyers and Colourists, Great Britain and Conn's Biological Stains (9th ed 1977).

Suitable monoazo dyes are: 4-(p-Ethoxyphenylazo)-m-phenylene-diamine monohydrochloride, Orasol Navy Blue TM, Organol Orange, Janus Green TM, Irgalith red P4R, Dimethyl yellow, Fast Yellow, Methyl red sodium salt, Alizarin Yellow R TM, Eriochrome Black T, Chromotrope 2R, Ponceau 6R, yellow Orange S TM, Brilliant Ponceau 5R TM, Chrysolidin G TM, Eriochrome black A, Benzyl orange, Brilliant Ponceau G/R/2R TM and chromolan yellow.

Suitable diazo dyes are: Fat red BS TM, Sudan Red B TM, Bismarck Brown G TM, Fat Black TM, Resorcin Brown TM, Benzofast Pink 2 BL TM and Oil Red EGN TM.

Suitable triarylmethane dyes are: Methyl violet, Xylene cyanol FF TM, Erioglaucine TM, Fuchsin NB TM, Fuchsin, Parafuchsin, Aurintricarboxylic acid Ammonium salt, Patent Blue, Victoria blue R TM, Crystal violet and Irgalith Blue TNC TM.

Suitable xanthene dyes are: Phloxin B, Fluorescein sodium salt, Rhodamine B TM, Rhodamine B Base, Rhodamine 6G TM, Pyronin G, Irgalith Magenta TCB TM, Irgalith Pink TYNC TM, Eosin Scarlet TM, Eosin Yellowish, Erythrosin extra bluish TM, 4'5'-Dibromofluorescein, Ethyl eosin, Gallein, Phloxine TM, Erythrosin yellowish Blend TM and Cyanosin B TM.

The suitable sulphonephthaleins are cresol red, chorophenol red, chlorophenol blue, bromophenol blue, bromocresol purple and chlorocresol green.

The suitable acridine dyes are: Corisphosphine O TM, Acriflavine and acridine orange.

The most suitable quinoline dyes are: pinacyanol chloride, pinacyanol bromide, pinacyanol iodide, quinaldine red, cryptocyanine, 1,1'-Diethyl-2,2'-cyanine iodide, 2-(p-Dimethylaminostyryl)-1-ethyl-pyridinium iodide, 3,3'-Diethylthiadicarbocyanine iodide, ethyl red, Dicyanine A, Merocyanine 540 TM and Neocyanine TM.

The suitable azine dyes are: Neutral red chloride, Neutral red iodide, Nigrosine TM, Savinyl blue B TM, Orasol blue BLN TM, Safranin O TM, Azocarmin G TM, Phenosafranine TM, Azocarmine BX TM and Rhoduline violet.

The suitable oxazine dyes are: Solophenyl Brilliant Blue BL TM, Nile blue A TM, Gallocyanine TM, Gallamine Blue TM and Celestine blue.

The suitable dyes are: Methylene blue, Thinonin Toluidine Blue O, Methylene Green and Azure A/B/C TM.

The suitable anthraquinone dyes are: Savinyl Green B TM, Savinyl Blue RS, D+C Green 6 TM, Blue VIF Organol TM, Alizarin, Alizarin Cyanine 2R TM, Celliton Blue Extra TM, Alizarin Blue S TM, Nitro Fast Green GSB, Alizarin red S, Chinalizarin, Oil Blue N, Solvay Purple TM and Purpurin TM.

The suitable indigold dyes are: Ciba Blue TM, Indigo Synthetic TM, Chromophtal Bordeaux RS TM and Thioindigo red.

Instead of one or more Group I compounds, to be used in the novel composition of matter, mixtures can be employed.

The group of organic acidic compounds with a pK less than about four generally consists of organic acids and/or the halogenated sulfonphthaleins which are soluble in the selected solvent, when the later is in the liquid state. Examples of these acids include oxalic acid, maleic acid, dichloroacetic acid, trichloroacetic acid, 2-naphthalene-sulphonic acid, chloroanilic acid, bromophenol blue, bromothymol blue, chlorophenol red, bromochlorophenol blue, bromocresol green, 3,4,5,6-tetrabromophenol-sulfonphthalein, bromophenol red, chlorocresol green, chlorophenol blue, bromocresol purple and 2,4-dinitrobenzenesulphonic acid.

The group of basic dyes or basic indicators are generally the aminotriphenyl methanes, also known as the triaryl methanes, or their soluble salts, 8-hydroxyquinoline and the quinoline dyes, preferably the cyanines. Examples are: basic fuchsin, pinacyanol iodide, pinacyanol chloride, pinacyanol bromide, 2-p-(dimethylaminostyryl)-1-ethyl-pyridinium iodide, crystal violet, cryptocyanine, dicyanine A, 3,3'-diethylthiacarbocyanine iodide, 1,1'-diethyl-2,2'-cyanine iodide, ethyl red, quinaldine red, ethyl violet, brilliant green, pararosaniline, pararosaniline acetate, 8-hydroxy-quinoline, 1-ethylpyridinium iodide and 5-(p-dimethyl-Aminobenzilidine) rhodanine.

Preferably the weight of the acid compounds is about three or more times the weight of the basic compounds.

The above-mentioned pK values refer to the pK values as measured in water. Generally it is preferred that the pK of the acidic compound is lower than the corresponding pK value of the basic compound. Preferably the acid compounds have a pK value less than about four and the basic compounds have a pK value less than about 5.

It should be noted that when the basic compound consists solely of one or more aminotriphenylmethanes or their soluble salts, the acid compound must be selected from the group consisting of tetrahalogenated sulphonphthaleins and the other organic acids having a pK of less than about 2.

Preferred combinations of acidic compounds having a pK less than about 4 and basic dyes or basic indicators are bromophenol blue/basic fuchsin, chlorophenol blue/ethyl red and trichloracetic acid/3,3'-diethylthiadicarbocyanine iodide.

Mixtures of one or more organic acids having a pK less than about 2 and one or more acid dyes or acid indicators, used in the novel composition of matter, changes color when the solvent passes from the solid into the liquid phase or reversed. In this combination the acid dyes used are preferably halogenated sulfonphthaleins.

Mixtures of one or more organic dyes, having a molecular structure containing a lactone group and one or more acids having a pK of about 8 to about 12, used in a solvent also change color when the solvent passes from the solid phase onto the liquid phase or reversed. In that combination the preferred compounds are crystal violet lactone and one or more of acids such as phenol, bisphenol A, pyrocathecol or 3 nitrophenol.

The novel compositions of mater most preferably comprise (a) a suitable inert solvent as described above adapted to change from a solid state to a liquid state at substantially the predetermined temperature and (b) one or more organic moieties soluble in said solvent and adapted to change color upon the change in state of the solvent at substantially the predetermined temperature when so dissolved, and selected from:

(1) one or more Group III compounds consisting of pinacyanol iodide, quinalidine red, 1,1'-diethyl-2,2'cyanine iodide, pinacyanol chloride, thionin, methylene blue, cresol red, chlorophenol red, neutral red, iodide, neutral red chloride, crystal violet, acridin orange, toluidin blue O, Orasol Orange RLN TM, Orasol Navy Blue TM, Irgalith Red PR TM, Fat Red BS TM, methyl violet, Xylene Cyanol FF TM, Rhodamine B TM, Rhodamine 6G TM, Irgalith Magenta TCB TM, Irgalith Pink TYNC TM, Toluidin Blue O TM, Savinyl Green B TM, Savinyl Blue RS TM, purpurin, 3,3'-diethylthiadicarbocyanine iodide, cryptocyanine, Dicyanine A, merocyanine 540, 4-(p-ethoxyphenylazo)-m-phenylene diamine monohydrochloride, Yellow Orange S TM, Chrysidan G TM, fuchsin, Aurintricarboxylic acid (ammonium salt), Victoria Blue R TM, Pyronin G TM, gallein phloxine, Erythrosin Yellow Blent TM, chlorophenol blue, bromophenol blue, bromocresol purple, Coriphospine O TM, acriflavine, acridine orange, rhoduline violet, Alizarin cyanin 2R TM, Alizarin Red S TM, alcannin, Aurantia, Direct Green G TM, Fast Red Salt 3GL TM, Irgalith Blue GLSM TM, phthalocyanine, Di Amingreen B TM, Alizarian Blue S TM, Celliton Blue Extra, neocyanine, Janus Green TM, dimethyl yellow, Fast Yellow TM, methyl red sodium salt, Alizarin yellow R TM, Eriochrome black T TM, Chromotrope 2R TM, Ponceau 6R TM, Brilliant Ponceau G/R/2R TM, Chromolan yellow, Sudan Red B TM, Bismarck Brown G TM, Fat Black TM, Resorcin Brown TM, Benzofast pink 2BL TM, Oil Red EGN TM, Euroglaucine, Fuchsin NB TM, parafuchsin, Patent Blue TM, Irgalith Blue TNC TM, Phloxin B TM, fluorescein sodium salt, Rhodamine B base TM, Eosinscarlet, Eosin Yellowish TM, Erythrosin extra bluish, 4'5-dibromo fluorescein, ethyleosin, Phloxine TM, Cyanovin B TM, chlorocresol green, pinacyanol bromide, 2-p-dimethylaminostyryl)-1-1-ethyl pyridinium iodide, ethyl red, neutral red, iodide, nigrosine, Savinyl Blue B TM, Orasol Blue BLN TM, Safranin O TM, Azocarnum G TM, Phenosafranine, Azocarmine BX TM, Solophenyl Brilliant Blue BL TM, Nile Blue A TM, gallocyanine, Gallamine blue, celestine blue, methylene green, Azure A/B/C TM, Glue VIF Organol TM, Alizarin, Nitrofast Green GSB TM, quinalizarine, Oil Blue N TM, Solvay Purple TM, Ciba Blue TM, Indigo Synthetic TM, Chromophtal Bordeaux RS TM, Thiorifolex TM, Acid Alizarin Ret B TM, 5-aminoflourescein, Rose Bengal TM, Martius Yellow TM, Chicago Blue 6B TM, Alcian Blue 86X TM, cresyl violet, 4,4'Bis(dimethylamino) benzylhydrol, Zinc Pthalocyanine, Sudan III TM, Pyronin Y TM, Toluylene Blue TM, cresyl violet perchlorate, Mendola's Blue TM, 3,3'-diethylthiadicarbocyanine iodide, Phosphine Dye TM, Nitron TM, cresyl violet acetate, ceres orange R TM, 4-phenylazo-1-naphtylamine, 4-(4-Dimethylamino-1-naptylazo)-3-methoxybenzene sulfonic acid, Bindschedler's Green TM, and p-(p-dimethylaminophenylazo)benzoic acid (hereinafterwards referred to as the Group III compounds or Group III organic moieties), or (2) a binary mixture of:

(A) one or more of a Group I body of compounds (hereinafterwards referred to as the Group I compounds) consisting of (a) the organic acids, which when inserted in the solvent system at conditions other than supersaturation will yield a color change visible to the naked eye, and also have a pK of less than about four and (b) the halogenated sulfonphthaleins; and (B) one or more of a Group II body of compounds (hereinafterwards referred to as the Group II compounds) consisting of the aminotriphenylmethanes and their soluble salts, 8-hydroxyquinoline, and the cyanines, with the proviso that if no Group III compound is present and if the Group II compounds must be selected from one or more of the group consisting of consist solely of one or more aminotriphenylmethanes or their soluble salts, then the Group I compound must be selected from one or more of the group consisting of oxalic acid, suitable sulfonic acids and the tetrahalogenated sulfonphthaleins, and other organic acids having a $pK_1$ of about or less than 2.

Of course, the primary application of the instant invention is where the change in state of the novel composition of matter is induced by temperature forces for use in a temperature-indicating device. By "suitable sulfonic acids" we mean sulfonic acids soluble in the selected solvent; these may be, for example, benzene sulfonic acid, naphthalene sulfonic acid, toluene sulfonic acid, anthrazene sulfonic acid, etc., depending on the solvent.

An interesting phenomena exhibited by the novel compositions is illustrated by the example of a composition consisting essentially of pinacyanol iodide (at 0.035 weight percent) in orthobromonitrobenzene:orthochloronitrobenzene solvent (75:25). In the liquid phase this composition is blue, and in the solid phase appears rose/tan. However, if the composition is chilled to a very low temperature at a very high rate of cooling initially, the color of the solid appears purple. As the composition is allowed to warm to room temperature, the color changes from purple to rose/tan, requiring about 3–5 minutes for the color to become rose/tan. Similar phenomena have been observed with other novel compositions containing other Group III moieties or other Group I plus Group III combinations.

Another example of an especially preferred Group I compound is chlorophenol red at a concentration of about 0.05 percent by mass. When dissolved in a solvent such as para-toluic acid, OCNB/OBNB, dibenzofurane and other halogen nitrobenzenes, the liquid composition has a yellow color.

As enumerated above, in the absence of one or more Group III compounds to be used for the organic moieties in the solvent system, one or more of a Group I body of compounds must be employed together with one or more of a Group II body of compounds. The Group I body of compounds generally consist of (a) the organic acids, which when inserted in the solvent system (at conditions other than supersaturation) will yield a color change visible to the naked eye, and have a pK of less than about four, and (b) the halogenated sulfonphthaleins which are soluble in the selected weakly polar or nonpolar aromatic solvent described below. Preferably, the Group I compound has a pK of between zero and three, and most preferably between about zero and about two. Example of this Group I body of compounds include oxalic acid, naphthalenesulfonic acid, trichloroacetic acid, bromophenol blue, bromothymol blue, chlorophenol red, bromochlorophenol blue, bromocresol green, 3,4,5,6-tetrabromophenol sulfonphthalein, bromophenol red, and chlorocresol green. Some compounds, such as maleic acid, will work if soluble in the predetermined solvent system employed if the correct Group II compound is chosen.

These first groups of compounds, which are generally the halogenated sulfonphthaleins, are derivatives of the sulfonphthaleins in the following ways: first the unsubstituted compounds are diprotic acid/base indicators, each having pK values of (1) a $pK_1$ of about 2 and (2) a $pK_2$ of about 7 to about 9. The halogenated derivatives show only one pK which is much lower than the $pK_2$ of the unsubstituted sulfonphthalein. Because there are halogen substituents on the sulfonphthalein molecule, it is our belief (while we do not limit the invention to the validity of our theory) that the pK value is reduced and the acid strength of the Group I is increased. As a consequence of this, the halogenated derivatives will respond in combination with one or more of the Group II compounds enumerated below to produce the color reaction. For example, in a OCNB-OBNB solvent system and in combination with basic fuchsin (a Group II material), bromochlorophenol blue (a Group I material) gives a green color in the solid phase and a strikingly red color in the liquid phase. This is very similar to the color found when the bromophenol blue (a Group I compound) is combined with basic fuchsin in the same ortho-chloronitrobenzene: ortho-bromonitrobenzene solvent system.

The group II compounds, which are generally the aminotriphenylmethanes, their soluble salts, 8-hydroxyaminotriphenylmethane, and the cyanines, act in our opinion as constituents which perform a "dye" function. Of course, as indicated by the disclosure above, a Group I compound may also act as a "dye" function. Examples of Group II compounds include ethyl red, crystal violet, pararosaniline (or "para Rosaniline Base"), pararosaniline acetate (or "para Rosaniline acetate"), basic fuchsin, 8-hydroxyquinoline, ethyl violet, brilliant green, pinacyanol chloride, and 3,3-diethylthiadicarbocyanine iodide. The Group I compounds are preferably selected from the group consisting of bromophenol blue, bromochlorophenol blue, and bromothymol blue. One will notice that the second group of compounds generally consist of dyes which have basic nitrogen groups either as substituent amines or in heterocyclic rings. In general, the addition of one or more of the first group of compounds along with the second group of compounds to a solution of the previously described nonpolar or weakly polar aromatic solvent(s) such as ortho-chloronitrobenzene and ortho-bromonitrobenzene solutions will provide a color difference between the solid and liquid phases of the aromatic solvent. It is preferred that the total weight of the Group I and Group II compounds be about 0.025 to about 0.05 total weight percent of the entire weight of the novel composition of matter. It is advised that the melting point of the Group III or Group I and Group II moieties be more than the melting point of the solvent system. It is preferred that the melting point of each of the Group I and Group II constituents be substantially more than the melting point of the solvent system selected, and it is much preferred that these Group I and Group II compounds melt at more than sixty degrees above the melting point of the solvent system. A basic requirement is that at least one of the Group I and Group II compounds reflects or absorbs light in the visible area of the spectrum on or below the melting point of the solvent system or, in the alternative, on or above the melting point of the solvent system, or both, in different colors so that a change in color is visible to the naked eye. It is also preferred that the Group I compounds weigh three or more times the weight of the Group II compounds. While 0.05 weight percent of the total of the Group I and Group II compounds or Group III compound(s) is most preferred, any effective amount from the smallest for which the change in color is visible to the naked eye upon change in phases is satisfactory, and certainly no more than the solubility limits of the Group I and Group II compounds (or Group III compound(s)) in the solvent system at the melting point might also be affected. A supersaturated solution of Group I and Group II compounds (or Group III compound(s)) in the solvent system, is not preferred, since Group I-III compounds are substantially more expensive than the solvent system constituents and an excess of them will be extravagant. Any pressure may be employed in making or in using the novel composition(s) of matter in a temperature-indicating device so long as the solvent does not generate a substantial vapor in the application for the composition. If a Group III compound is not employed, it is preferred that the Group I compound have a lesser $pK_1$ and $pK_2$ value than the corresponding pK values of the Group II compound. Preferably, the Group II compound should have a $pK_1$ value of less than about 5, and the Group I compound should have a $pK_1$ of less than about 4.

As it will be appreciated by those skilled in the art, it is possible with the disclosure given above to combine almost any Group I compound of the indicated pK, which is soluble in the solvent system selected, (a solvent system of ortho-bromonitrobenzene: ortho-chloronitrobenzene, for example) and a complementary acid base material from Group II and generate practically any desired change in color. The considerations for those skilled in the art will be (1) the selection of group III and/or Group I and Group II compound(s) which yield a satisfactory change in predetermined colors; (2) that these compounds are soluble in the solvent system in the liquid state; (3) that the solvent system be properly determined for the temperature range desired; (4) that the Group I and/or Group II compounds (or Group III compounds) be soluble in the desired system and (5) if pertinent, that one compound of the Group I compounds react as a strong acid against one or more of the Group II compounds in the solvent system.

As it will be recognized by those skilled in the art, one may employ combinations of more than one Group III moiety, or a combinations of more than one Group III moiety, or a combination of a Group III moiety and a Group I moiety, or a combination of a Group II moiety and Group III moiety, or more than one Group I moiety with more than one Group II moiety to obtain color shifts generally not found in a single system, e.g., a mixture of pinacyanol iodide and quinaldine red (two Group III compounds) yields a tan solid and deep dark purpose liquid. There are some instances where two Group I compounds may be operable where one acts as an acid relative to the other e.g., (1) naphthalene sulfonic acid and one or more of (2) bromochlorophenol blue, chlorophenol blue, or bromocresol purple.

As an alternative to using one or more of the Group II compounds with one or more of the Group I compounds, one may select one of the aforesaid Group III compounds with (or preferably) in place of a combination of one or more Group I compounds and one or more Group II compounds. A caveat and proviso must be stated: in absence of a Group III compound one must employ one or more Group I compounds with one or more Group II compounds; if the Group II compounds consist solely of one or more aminotriphenylmethanes or their soluble salts, then the Group I compound must be from one or more of the group consisting of oxalic acid, suitable sulfonic acids, tetrahalogenated sulfonphthaleins, and other soluble strong organic acids having a $pK_1$ of about or less than 2.

Another example of a Group I compound and a Group II compound is bromophenol blue and basic fuchsin. In the solid form, the basic fuchsin behaved as if it were at a very low pH and was in a form which has a green color between its $pK_1$ and $pK_2$. This green color of basic fuchsin at very low pH is a little known fact, but can easily be demonstrated in any laboratory with common reagents. In the liquid form, however, the bromophenol blue is yellow. The basic fuchsin was not in its first acid from and became red.

As will be appreciated by those in the art, generally the color of the liquid is the same or similar to the color of the Group II compound or Group III compound when dissolved in the liquid phase of most of the suitable solvents employed.

Similarly, crystal violet, which is a pH indicator having a $pK_1$ of approximately 1, forms, in combination with oxalic acid and dissolved in the OCNB/OBNB solution, a blue liquid and a yellow solid.

As alternative to the above for Group I-Group II combinations, when the Group I material is other than a simple acid, and is a "dye" compound (such as bromophenol blue), in addition to the group I's behavior as an acid, not wishing to be bound by theory, it is postulated that there may be formed in the composition aggregates, mixed polymers, and the like, which cause what is referred to in the literature as "metachromism" or "metachromacy". "Metachromacy" is that property of a substance which is expressed as a change in color (according to the wavelength of the light in which it is viewed) due to an outside force "metachromacy" is mainly attributed to that color change phenomena when a dye is brought together with certain "tissue" molecules (macromolecules, e.g., solid materials such as heparin, polysaccharides). Certain organic dyestuffs, however, are characterized by different colors when dissolved in inert solvents, which is described as "solvatochromism". See HACKH'S CHEMICAL DICTIONARY 421 (4th ed. 1969).

Once the organic moieties Group III compounds and/or Group I and Group II compounds are determined for the desired color change, they are added to a liquid mixture of the solvent constituents for the predetermined temperature and mixed, preferably by any suitable industrial mechanical mixing means known to those in the art until a substantially complete dissolution has been obtained.

After the solvent weight fractions have been determined and the novel composition of matter formed for each of the increment temperatures to be tested, a suitable temperature-indicating device is constructed such as the novel device described below having a plurality of temperature-sensitive regions, preferably having cavities in a heat-conductive carrier such as aluminum wherein each novel composition of matter corresponding to one of the preselected points along the temperature curve fills one of the regions, preferably a cavity, in the heat conductive carrier device. A method and apparatus for depositing precisely metered quantities of a temperature-sensitive composition of matter on a surface is taught by Pickett, et al, U.S. Pat. No. 3,810,779 (1974), incorporated herein by reference, and the techniques of that patent are incorporated herein as much as copied verbatim. A preferable device for sealing a heat-sensitive transparent cover sheet means in vacuum-sealing engagement with an aluminum heat-conductive carrier over cavities in the carrier is the Webb Model No. 2 machine manufactured by Bio-Medical Sciences, Inc., in Fairfield, N.J.

2. Temperature-Indicating Device

In FIG. 1, a novel temperature-indicator device is disclosed comprising a flat, gradually curved, or substantially curvilinear heat-conducting carrier means having one or more spaced cavities defined herein to determine a like number of predetermined temperatures in a temperature range by means of a like number of different thermally-responsive composition of matter. Each of the predetermined temperatures is associated with a composition of matter that is substantially without impurities. The novel temperature-indicating device comprises (1) a flat, gradually curved, or substantially curvilinear heat-conducting carrier with one or more cavities indented therein; (2) a transparent cover sheet means in sealing engagement with the carrier means above and overlying each of said cavities to form an enclosure between the walls of the cavity and the transparent cover sheet means; and (3) a composition of mater which substantially fills the cavity and is adapted to change from a solid to a liquid at substantially the predetermined temperature associated with said cavity.

In the preferred embodiment shown in FIG. 1, the carrier means cavity is in the shape of a trapezoid rotated around its axis, having a large diameter, 8, at the top of the cavity and a smaller diameter, 9, at the bottom of the cavity. The thickness 7, of the transparent film, 4, is preferably substantially equal to the thickness, 6, of the heat-conducting carrier means, 2. While the exact dimensions (6, 7, 8, 9, 11, 12) of a cavity in items such as those in FIG. 1 vary with the solvent system employed, the material selected, and the composition of matter which is predetermined it is well to describe a device employing ortho-chloronitrobenzene and ortho-bromonitrobenzene recently constructed.

Referring again to FIG. 1, the heat conducting carrier means, 2, is an aluminum foil of thickness, 6, of approximately 0.003 inches. Where aluminum is used, its thickness may vary from about 0.001 inches to about 0.004 inches. In any event, the selection of such heat-conductive carrier means is well within the knowledge of those skilled in the art and needs no further elaboration. In a particularly effective embodiment, the heat-conducting carrier means may be made of plastic. Thereby, the carrier is provided with the necessary strength to serve as the main structural support, while at the same time providing rapid and uniform temperature distribution throughout the thermometer device. As a consequence, the time required for taking temperature is substantially diminished. The depth, 12, of cavity "A" in FIG. 1 is selected to be preferably 0.004 inches, with the upper horizontal width, 9, being approximately 0.035 inches. The thickness, 7, of the transparent film is approximately 0.001 inches. The transparent film cover means, 4, may be polypropylene, Mylar (polyethyleneterephthalate), nitrocellulose, polyvinyl chloride, etc. In FIG. 1, the transparent film cover means, 4, is preferably a heat-sensitive material and is a coextruded film of Nylon 6 ® (manufactured by the Allied Chemical Company) and a polypropylene ionomer, Surlyn 1652 ® (manufactured by E. I. duPont deNemours & Company) which film is produced by Pierson Industries Incorporated that is subsequently laminated to polypropylene by the Millprint Company of Milwaukee, Wis.

In each cavity "A", such as that shown in FIG. 1, one of the predetermined compositions of matter that is associated with a predetermined melting point is poured into the cavity, filling approximately 60% of said cavity. After partial filling of each cavity "A" with a particular composition of matter (here OCNB:OBNB) associated with a temperature to be measured (in the case of the prior art device) between 96.0° F. and 104.8° F.), transparent film, 4, is put in sealing engagement with aluminum foil, 2, through the use of machine such as the Webb Model No. 2 manufactured by Bio-Medical Sciences Inc. of Fairfield, N.J. As will be recognized by those skilled in the art, small deviations could be made in ratios of the dimensions 6 through 12, or alternatively, the ratios could be maintained for different sized systems (e.g., by multiplying dimensions 6 through 12 by a uniform but different constant) without substantially affecting the results of the invention.

Figure 2:
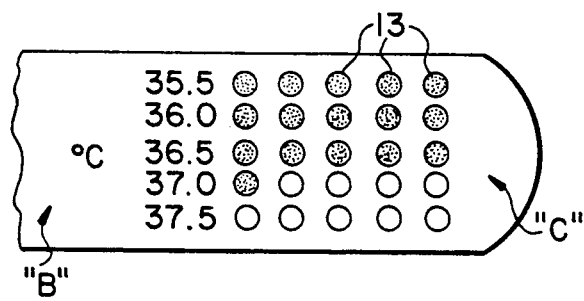
FIG. 2 is a partial overhead plan view of a device over part of the clinical range of temperatures embodying the principles of the prior art '552 U.S. Patent in degrees Celsius.

FIG. 2 presents a partial plan view from above and the side of one embodiment of the prior art thermometer of the '552 patent showing a heat-conducting carrier means "C" of a thermometer in a Celsius scale. In a particularly effective embodiment of this clinical thermometer, a rectangular grid is formed wherein each cavity 13 employs a construction as in FIG. 1 and is clearly associated with a temperature to be determined within the range of temperatures to be tested through markings located on the side of the grid.

Figure 3A:
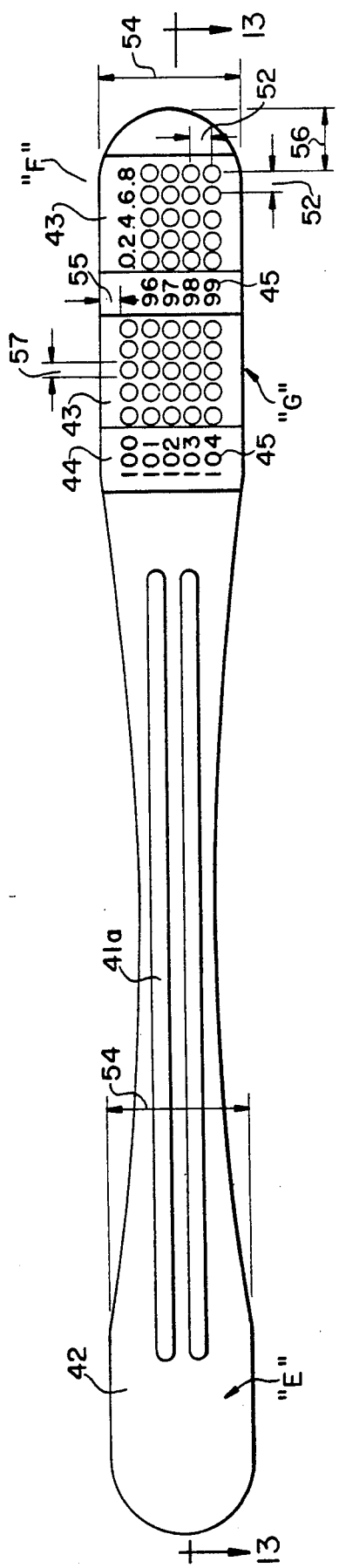
FIGS. 3A and 3B are, respectively, a plan view of a prior art flat temperature-indicating device from the vertical, comprising a heat-conducting carrier means with a grid of cavities thereon; and an elevation view taken along line 3—3 in FIG. 3A revealing the heat-conducting carrier means, cavities within transparent cover sheet means, and a bottom plate means.
Figure 3B:
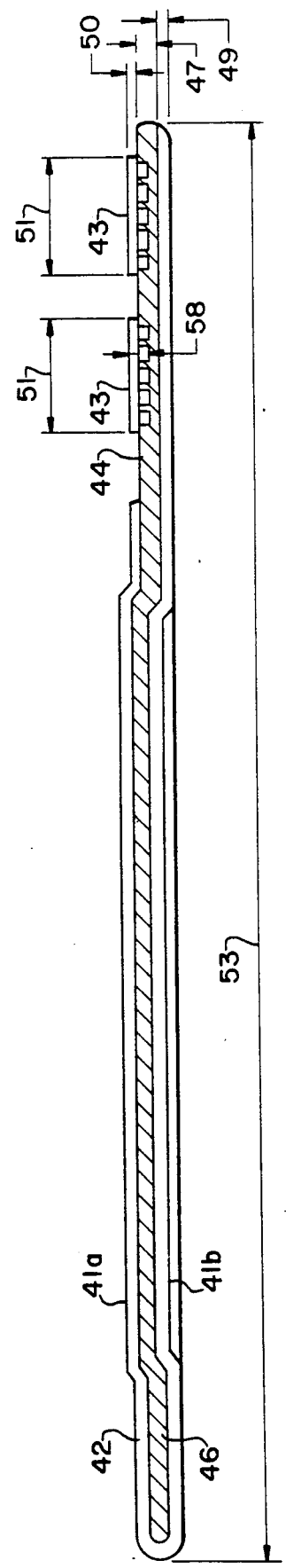

In FIGS. 3A and 3B, another embodiment of the prior art a thermometer is disclosed for measuring temperatures at 0.2° F. increments from 96.0° F. to 104.8° F.1, combining the novel compositions of matter of this invention (preferably OCNB:OBNB/pinacyanol iodide) with the novel cavities of FIG. 1.

FIG. 3A displays a plan view of the substantially flat axillary temperature indicting device as seen from above. Again, the thermometer has an aluminum heat conducting carrier means, 44, (of thickness, 47, in FIG. 3B) which acts not only as a main structural body of support, but at the same time provides rapid and uniform temperature distribution throughout the spatula portion "F" (having width 54 containing grid "G" of a plurality of cavities (each of diameter, 57, and spaced center-to center which each neighbor along a horizontal "x" axis or vertical "y" axis in FIG. 3 at a distance, 52, apart) of FIG. 1, each cavity with the novel composition of matter and each associated with a predetermined temperature to be measured at 0.2° F. increments from 96.0° F. to 104.8° F., and each novel composition of matter substantially spherical void within said cavity. "Spatula" portion "F" of the device of FIG. 3 is rounded for safety so that some distance 56 is maintained between the most forward row of cavities and the edge of the device.

Again in FIG. 3A, one will note that the aluminum heat-conducting carrier means is covered above for the entire handle "E" portion of the thermometer device by a top plastic layer, 42, of width, 54, preferable made out of a plastic such as polystyrene, polypropylene, or polyethylene.

Also in FIG. 3A, it will be recognized that the handle "E" has been stamped from below so as to make the device realize two ridges, ribs, or abutments, 41a, that protrude from above the carrier means, 44, by some nominal distance which is approximately the same as nominal distance which is approximately the same as thickness, 47, as shown in FIG. 3B, of carrier means, 44,; likewise, the device realizes two cavities, 41b, in carrier means, 44, that parallel the ridges, 41a. As will be appreciated by those skilled in the art, although the distances shown in FIGS. 3B can be readily adjusted with respect to one another or in proportion (widths 47, 48, 49, 50, 51, 52, 53, 54, 55, 56, 57, and 58 can be multiplied by different constants) it is well to describe a device for measuring human temperatures in the range of 96.0° F. to 104.8° F. that we recently constructed, employing ortho-chloronitrobenzene and ortho-bromonitrobenzene in a solvent system with pinacyanol iodide in the amount of 0.035% by weight to form a thermometer with the novel compositions of matter of this invention, which is the best mode of our invention and which is marketed by Organon Inc. (West Orange, N.J.) under the trademark TEMPA DOT READY STRIP ®. Referring again to FIG. 3A, the thermometer has a width 54 of about 0.345 inched at the widest portion of handle "E" and has the same width 54 of about 0.345 inches at the widest portion of handle "E" and has the same width 54 of about 0.345 inches in the spatula portion "F" of the thermometer. The cavities each have a diameter 57 of about 0.039 inches and each cavity has a depth of about 0.005 inches, and is spaced from each neighbor on a horizontal "x" axis or vertical "y" axis by a distance 52 of 0.015 inches. The top and bottom rows of cavities are of a distance 55 of about 0.039 inches from the leading edges, respectively, of the thermometer, and have a center line on the right-hand column which is a distance 56 of about 0.193 inches from the tip of the rounded edge of the spatula "G" portion of the thermometer. In the elevation view of FIG. 3B taken along line 3—3 of FIG. 3B, it will be appreciated that the oral thermometer device has an overall length of 4.250 inches, and consists of an aluminum heat conducting carrier means 44 having an overall length of 4.250 inches and a depth 47 of about 0.003 inches. The aluminum head conducting carrier means 44 is covered on the handle portion "E" of the thermometer by a polypropylene or polystyrene layer of thickness, 48, of about 0.003 inches; the carrier means also is in engagement with a polypropylene or polystrene bottom plate mean, 46, of thickness, 49, of about 0.003 inches that traverses the entire length of the thermometer. Two bands of heat-sensitive material (coextruded film of Nylon 6 ® and Surlyn 1652 ® subsequently laminated to polypropylene) cover the two sub-grids (100° F. to 104.8° F. and 96.0° F. to 99.8° F.) and are each of width 51 of approximately 0.300 inches along the "x" axis and of depth 50 of from about 0.003 to about 0.005 inches.

It will be evident to those skilled in the art having access to this disclosure that ribs 41a in FIG. 3A are not necessary; indeed, many minor changes in the device shown in FIGS. 3A and 3B could be made without departing from the spirit of the invention. As a preferred embodiment, ribs 41a may be removed as in actual practice in the prior art clinical thermometer. (TEMPA-DOT ® READY-STRIP TM disposable clinical thermometer of Pymah Corporation, Somerville, N.J.).

Figure 4:
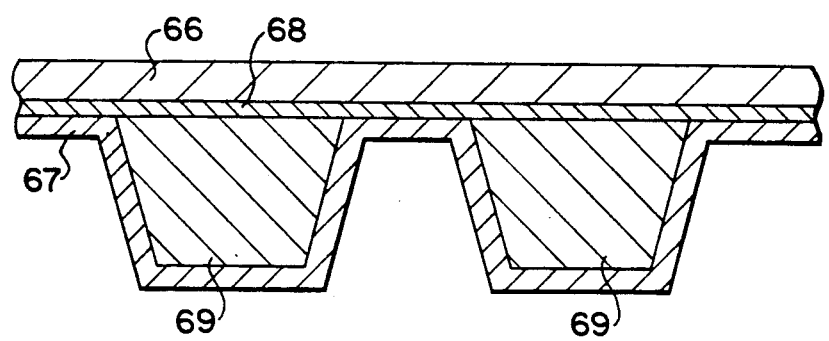
FIG. 4 is a partial plan view from the horizontal of a flat or gradually curved heat-conducting carrier having a cavity defined therein, where a cover layer is bonded to a carrier layer by a pressure-sensitive adhesive layer comprised of polyisobutylene (PIB)

FIG. 4 depicts a cross-sectional view of the disposable thermometer of the prior art showing cavities in which are held the temperature indicating system, 69. The heat conducting material, 67, is covered by a transparent layer, 66, which is bonded to the heat conducting material, 67, by a polyisobutylene adhesive layer, 68.

The prior art clinical thermometer of the '552 patent operates, as disclosed above, on a completion of melt principle. If an initiation of melt thermometer were attempted for the clinical thermometer the readings obtained would not be accurate. This is so because in "pockets" containing solid solution which is only partially melted, the unmelted solid solution acts as a nucleating agent. When the clinical thermometer is removed from the mouth those partially melted compositions would revert to the solid state and not show a color change.

In a preferred embodiment of the urine thermometer of this invention, the temperature sensing compositions are solid solutions of ortho-bromonitrobenzene (OBNB) and ortho-chloronitrobenzene (OCNB) selected to have observable initiation of melt temperatures of about 90° to 100.5° F. in 0.5° increments. The temperature sensing composition having incorporated therein the aforedescribed organic moieties useful in indicating temperature.

The term "observed initiation of melt" as used in the specification and claims with respect to the thermometers of this invention means the temperature at which a particular solid solution is observed to begin to melt based on a change of color of the organic moiety dye system. It is not the actual initiation of melt for the composition as would be detected by Differential Thermal Analysis techniques, but the observable change in state as detected by the color change in the indicator system. The term "temperature responsive composition" as used in the specification and claims means the prior art solid solutions described above suitable for use in thermometry. The term "temperature indicating composition" as used in the specification and claims means the temperature responsive compositions having incorporated therein sufficient organic moiety to cause an observable color change in the composition upon at least a partial melting of the temperature sensing composition. The term "organic moiety" as used in the specification and claims means the Group I, II & III dye systems herein described which exhibit a color change when incorporated into a thermally responsive material when the thermally responsive material changes state from a liquid to a solid or a solid to a liquid.

The preferred organic moiety systems are pinacyanol iodide and a combination of bromcresol purple and ethyl red. The solid solution is normally yellow. When the pinacyanol iodide is used as the organic moiety, the mixture has an initial color in the solid state of rose-tan which becomes blue on melting. When the bromcresol purple/ethyl red dye combination is used the solid phase is yellow, and the liquid phase is red.

In utilizing the organic moieties ("die") of this invention about 0.005 to about 0.2 wt. % dye, based on the weight of solid solution is used; preferably about 0.03 to about 0.1 wt. % dye is used.

In utilizing the thermometer of this invention it is necessary that it display real time temperatures. As the temperature of the urine changes the thermometer must respond to the temperature change. These limitations require that the thermometer for measuring urine temperatures be reversible and display an equilibrium temperature. Therefore, supercooling is unacceptable.

To insure that supercooling does not occur a nucleating agent is included in the composition. Illustrative, nonlimiting examples of nucleating agents are anthraquinone, talc and calcium carbonate. The preferred nucleating agent is anthraquinone. The anthraquinone does not have an observable effect on melting point of the system for the purpose of this invention.

The amount of anthraquinone used in a composition comprising OCNB/OBNB is determined from the formula $$S = 0.118e - 0.0144(T) - 0.326(C - 0.548) \quad (1)$$

where S is the weight percent of anthraquinone, T is a temperature in degrees Fahrenheit and C is the weight fraction of ortho-bromonitrobenzene. T is selected as the highest anticipated storage temperature. For clinical thermometers generally, T = 120° F.

In the prior art '612 thermometer the composition used in a particular labeled pocket had an actual initiation of melt temperature which was the same temperature as the pocket label, reduced by the offset. The offset was arbitrarily selected at 0.6° F. below the temperature to be read in order to observe a reading quickly. If the actual initiation of melt is used in the thermometer of this invention an incorrect reading is obtained. If the prior art offset of minus 0.6° F. is used the error is even greater. Not wishing to be bound by theory, it is believed that the cause of the incorrect reading is that the temperature sensing dye system does not result in an observable change in dye color until at least 20% of the composition has melted. In the prior art '612 thermometer an additional problem was encountered in than the indicator paper technique used resulted in what was termed "partial firing". That is, there was some observable reading in which judgment was called into play in order to decide whether the partially fired dot should be counted as a reading or be ignored. In considering the device of this invention it was anticipated that initiation of melt techniques would present a problem from the standpoint of having a gradation of color readings as the indicator system melted over the two degree range. Surprisingly, as soon as the "threshold" melting required to result in a color change occurred, the color intensity immediately took on its liquid state color, and there is no gradation of color to result in a potential judgment error in reading the device.

If a completion of melt technique is used in the urine thermometer as in the thermometer of the '552 patent, an incorrect reading is again observed. The cause of the error is in part because the solid solution has a two degree melting point range. Hence, the 98.6° F. pocket will have a melting point range of 96.6° to 98.6° F. Using the minus 0.6° F. offset of the prior art only results in an even larger error because the 98.6 degree pocket will fire at a temperature as low as 96.0° F.

With respect to the description of this invention the term "Offset" as used in the specification and claims means the difference in temperature at a given composition of solvent, between the melting point for the completion of melt of the solvent-dye system and the temperature of the observable initiation of melt temperature indicated by a color change for a particular dye indicating system. As has been noted above, the observable initiation of melt temperature is not the actual initiation of melt but a point along the melting point curve for a given composition at which sufficient solvent has melted in order to permit the indicating system to show a color change.

Surprisingly, it has been found that not only must the Offset be a positive Offset, but it cannot be of the same magnitude for each temperature to be indicated, as is the case for the prior art thermometers. In carrying out the practice of this invention it is necessary to determine the proper Offset for the temperature sensing composition. However, the method used in determining the composition of the solid solution for each temperature indication required, avoids a direct determination of the Offset, and the Offset is fortuitously achieved.

Since each batch of ortho-chloronitrobenzene (OCNB) and ortho-bromonitrobenzene (OBNB) will have a different melting point because of impurities it is first necessary to purify the ortho-chloronitrobenzene and ortho-bromonitrobenzene by distillation. Even after this purification there will be batch to batch variations in melting points of each of the two constituents of the solid solution. It is, therefore, necessary to prepare master batches with the desired melting pint from which the various compositions can be made.

The urine thermometer must be capable of measuring temperatures from 90.0° and 100.5° F. inclusive at 0.5° F. increments. Since the solid solution has a two degree melting point range this is accomplished by setting the observable initiation of melt temperature at the temperature of a particular designated location.

One method of determining the composition of the solid solution for each thermometer location is to first purify the ortho-chloronitrobenzene and ortho-bromonitrobenzene by distillation and then to determine the freezing point of various compositions. The freezing point is used because it is a more accurate determination than the melting point. The freezing point coincides with the completion of melt temperature.

The freezing point of the composition is identical to the completion of melt temperature for the same composition. Freezing point data was obtained for compositions between 100% o-chloronitrobenzene ("chloro") and 0% o-chloronitrobenzene (100% o-bromonitrobenzene). These data were tabulated as % chloro vs. completion of melt temperature and are shown in Table I. Freezing points are determined using the pure compounds without organic moieties indicator dyes or nucleating agent being added.

Alternatively, the observed melting point of solutions of various compositions can be determined, and a curve plotted for the data obtained. The compositions are prepared containing both the nucleating agent and the dye. The color change is observed after a partial melt of about 20% of the solid solution. Hence, the reading obtained does not represent the actual initiation of melt temperature, but the temperature at which sufficient melting has occurred to result in a color change of the dye indicator system.

TABLE I

| CHLORO (%) | Melting Point °C. |
|---|---|
| 100 | 32.1 |
| 80.0 | 32.998 |
| 70.0 | 33.56 |
| 54.0 | 34.6 |
| 42.0 | 35.6 |
| 31.5 | 36.6 |
| 23.0 | 37.6 |
| 16.5 | 38.6 |
| 7.5 | 39.7 |
| 0.0 | 40.85 |

100% ortho-bromonitrobenzene

Figure 5:
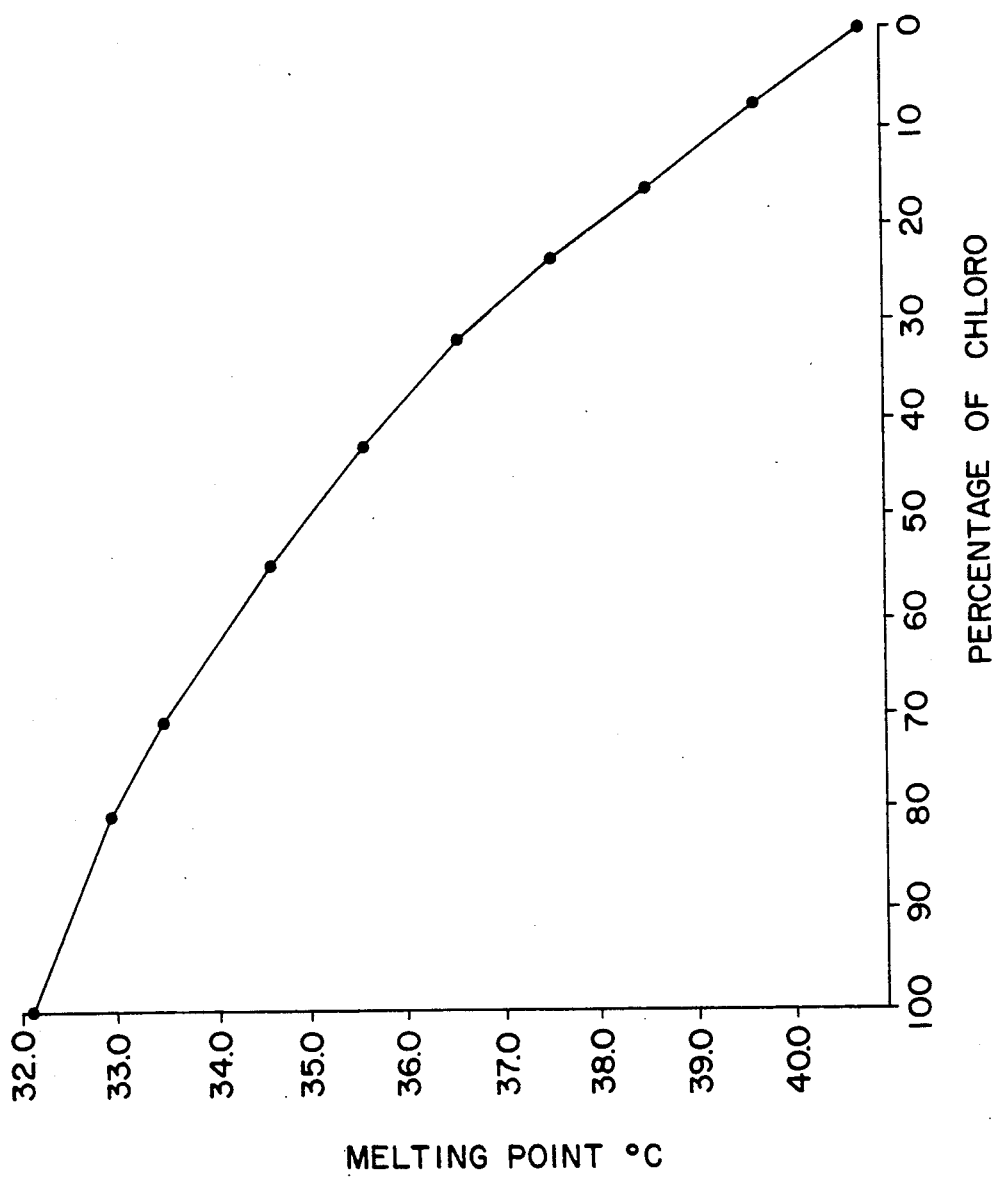
FIG. 5 is a plot of temperature vs. o-chloronitrobenzene content of o-chloronitrobenzene/o-bromonitrobenzene solid solutions.

A curve can be generated from the data of Table I as a plot of % chloro vs. melting point. This curve is shown in FIG. 5. Using the curve generated from the data of Table I (FIG. 5) seven master batches were prepared having the composition and melting points shown in Table II. Again the melting point is the completion of melt temperature.

TABLE II

| BATCH NO. | Chloro (%) | Melting Point (°F.) |
|---|---|---|
| 1 | 100 | 89.85 |
| 2 | 74.5 | 92.0 |
| 3 | 57.0 | 94.0 |
| 4 | 42 | 96.0 |
| 5 | 26.5 | 99.0 |
| 6 | 17.5 | 101.0 |
| 7 | 9.0 | 103.0 |

These batches contained anthraquinone in quantities determined using equation 91) as a nucleating agent and pinacyanol iodide as the organic moiety dye indicator.

Using the compositions of Table II, the actual observed melting point was determined. This observed melting point (Firing Point) occurs at about 20% partial melt, and differs from the completion of melt temperature as shown in Table II. The actual firing point of the compositions was determined by immersing thermometers in a water bath and gradually raising the temperature of the bath. The actual Firing Point is the perceived firing point observed as a result of a color change in the dye system. The actual firing point was determined for both freshly prepared compositions and compositions which had been aged for one week at 83° F. The results are shown in Table III. The "theoretical firing" point is the completion of melting temperature for the identified compositions.

The actual Firing Point (observed initiation of melt) will vary depending on the dye system used. This is because the phenomenon which results in color change may vary from system to system. For example, a substantially larger portion of the composition must melt in order to observe a color change where the dye system is a combination of ethyl red and bromcresol purple. Not wishing to be bound by theory it is believed that in the case of pinacyanol iodide the phenomenon for color change relates to solubility of the dye in the solid solution. In the case the ethyl red/bromcresol purple combination it is believed that the mechanism relates to the formation of a Lewis acid/Lewis base complex which requires a greater amount of the solid solution to melt before sufficient complex forms to result in an observable color change.

TABLE III

| Chlor (%) | AQ** (%) | Theoretical* Firing Point °F. | Actual Firing Point Fresh °F. | Actual Firing Point Aged °F. |
|---|---|---|---|---|
| 100.0 | 0.843 | 89.85 | 87.98 | 88.43 |
| 74.5 | 0.760 | 92.0 | 90.05 | 90.59 |
| 57.0 | 0.703 | 94.0 | 91.9 | 92.3 |
| 42.0 | 0.654 | 96.0 | 93.4 | 94.46 |
| 26.5 | 0.603 | 99.0 | 96.4 | 97.6 |
| 17.5 | 0.574 | 101.0 | 98.4 | 99.6 |
| 9.0 | 0.546 | 103.0 |  | 101.2 |

*Theoretical Firing Point = Completion of Melt temperature
**AQ = Anthraquinone; T = 105° F.

Figure 6:
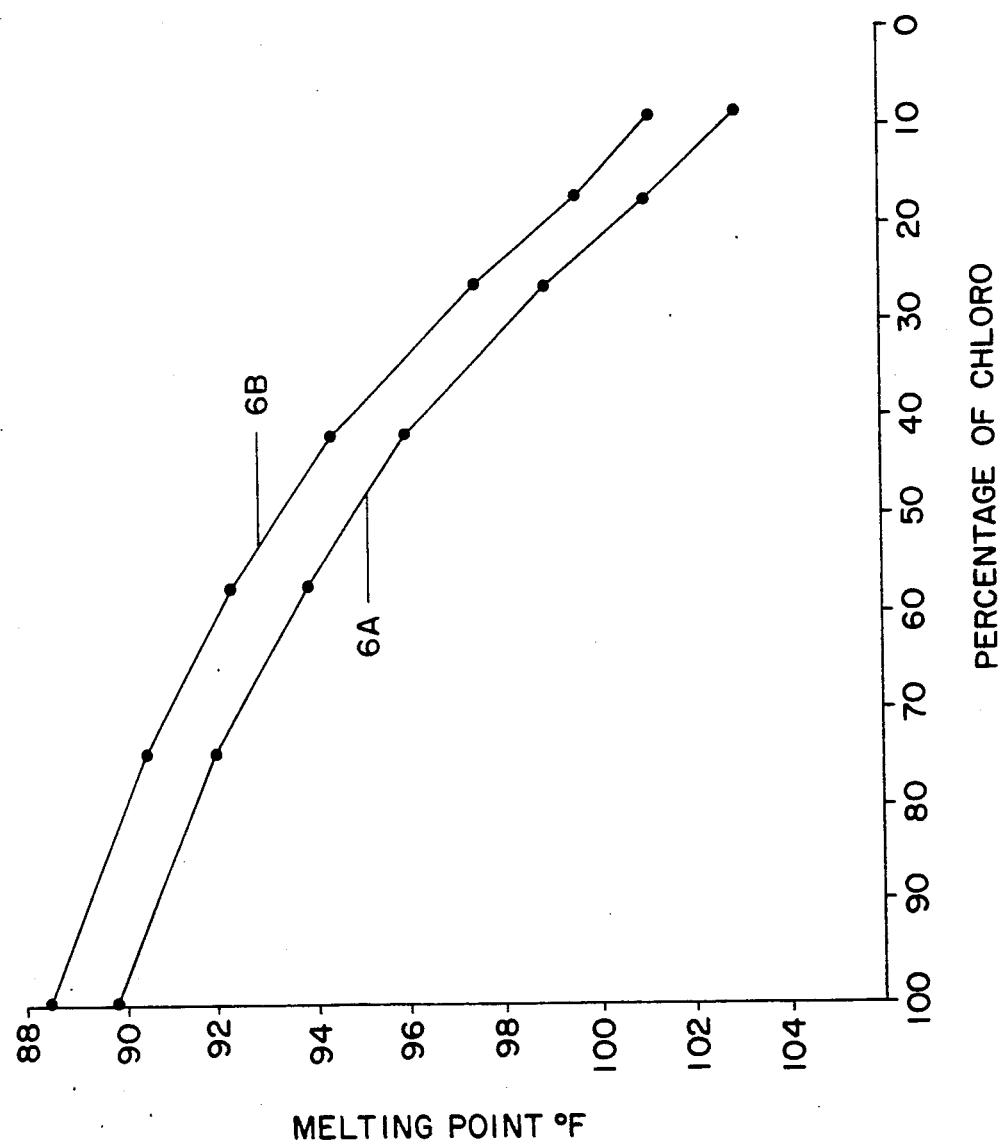
FIG. 6 shows plots of Temperature vs. O-chloronitrobenzene for theoretical and actual firing points of various compositions.

Using the Actual Firing Point data for the aged samples (Table III) a curve was developed for firing point vs. % o-chloronitrobenzene (FIG. 6B). FIG. 6A is the similar curve for the theoretical firing points. From the curve of FIG. 6B compositions were prepared having firing points from 90.0° F. to 100.5° F. in 0.5° increments, the required range of the urine thermometer. These compositions and the actual firing point (observed initiation of melt) are show in Table IV.

TABLE IV

| Firing Point °F. | Chlor (%) | AQ* (%) | Firing Point °F. | Chlor (%) | AQ** (%) |
|---|---|---|---|---|---|
| 90.0 | 81.5 | 0.653 | 95.5 | 37.0 | 0.508 |
| 90.5 | 75.5 | 0.634 | 96.0 | 34.5 | 0.500 |
| 91.0 | 70.5 | 0.613 | 96.5 | 32.0 | 0.492 |
| 91.5 | 65.25 | 0.600 | 97.0 | 29.5 | 0.484 |
| 92.0 | 62.0 | 0.583 | 97.5 | 27.0 | 0.476 |
| 92.5 | 55.75 | 0.570 | 98.0 | 24.75 | 0.468 |
| 93.0 | 52.25 | 0.559 | 98.5 | 22.5 | 0.461 |
| 93.5 | 48.75 | 0.547 | 99.0 | 20.25 | 0.545 |
| 94.0 | 45.25 | 0.535 | 99.5 | 17.75 | 0.446 |
| 94.5 | 41.8 | 0.524 | 100.0 | 15.25 | 0.437 |
| 95.0 | 37.5 | 0.516 | 100.5 | 12.75 | 0.429 |

*Anthraquinone T = 105° F. (Equation 1)

The weight percent ratio of OCNB:OBNB for the temperature range of interest is about 82:18 to about 12:88; more preferably about 81.5:18.5 to about 12.75:87.25.

A thermometer made with the compositions shown in Table IV will give real time readings with an observed equilibrium temperature the same as the pocket designation.

The compositions of this invention change melting points continuously for about one week at room temperature. After that time the temperature of melt stabilizes. From a practical standpoint it is not desirable to wait the one week period. not only is there time lost, but a quality control check cannot be made before the melt temperature is stabilized. It is preferred that the aging process be accelerated at elevated temperatures. Any temperature above room temperature and below the melting point of the temperature indicating compositions, i.e. 90° F. can be used. The preferred aging temperature range is about 80° to about 88° F. For the thermometers of this invention aging is most preferably carried out by holding the compositions at a temperature of about 83° F. for about twenty four hours.

Figure 7:
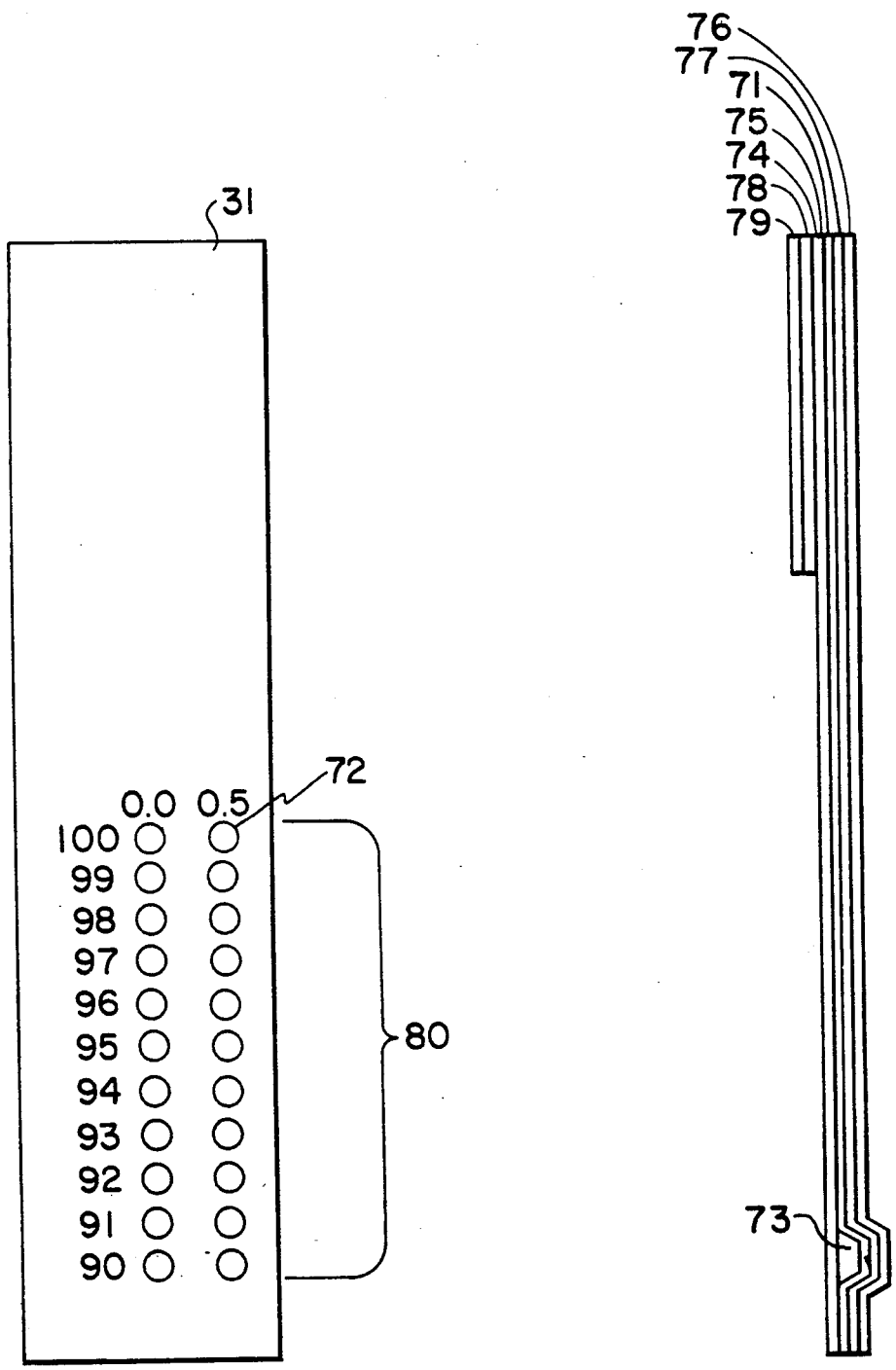
FIG. 7 depicts a plan and elevation view of the urine thermometer of this invention.

For use as a urine thermometer, the device does not require the complexity of the prior art thermometer described in FIGS. 1–3A and 3B. Referring to FIG. 7 a urine thermometer is shown which comprises a backing strip, 71, having pockets, 72, embossed therein, filled with the indicator composition, 73, and sealed by a transparent cover strip, 74.

The backing strip, 71, can be aluminum or of a polymeric material such as surlyn/nylon laminate. The backing strip must not be subject to attack by the solid solution or the organic moiety dye system. Where the backing strip, 71 is aluminum it is preferably protected from the indicating system by an intermediate film, of plastic, e.g., surlyn 1652 ®. The construction materials of the prior art chemical thermometers can be used in the urine thermometer of this invention. Hence, the backing strip, 71, can be the Surlyn 1652 ®/nylon composite of the prior art. The transparent Mylar ® cover strip described in connection with the '512 thermometer can be used in the construction of the urine thermometer of this invention. Since the adhesive used to bond the cover strip, 74, is polyisobutylene (PIB), the cover strip, 74, is preferably a mylar/polypropylene laminate. Since the PIB adhesive layer, 75, will not adhere to the mylar ® (ethylene glycol-terphthalic acid ester) it is necessary to interpose the polypropylene between the mylar and the adhesive. In a preferred embodiment the Nylon/Surlyn backing strip is protected from its environment by a white Mylar ® backing cover, 76, which is adhered to the backing strip, 74, by a polyurethane adhesive layer, 77.

The matrix, 80, for the thermometer of this invention comprises two columns, the first column ranges in whole numbers from 90° to 100° F. The second column presents the decimal values from 90.5° to 100.5° F. It is of coarse within the skill of those in the art to form any convenient matrix of temperatures without deviating from the scope of the invention.

In the practice of this invention a pressure sensitive adhesive layer, 78, may be applied to either the face or back of the thermometer. The thermometer is then adhered to the inside of a urine specimen bottle positioned so that it can be read through the specimen bottle which is transparent. While the thermometer is reusable, for this urine temperature application it is discarded and a fresh sample bottle with a fresh thermometer is used for each subject whose urine analysis is to be taken.

The adhesive utilized must be resistant to water. Any suitable commercially available adhesive material may be used. Illustrative of such useful adhesives is an acrylic adhesive No. 467 available from 3M Corporation. The adhesive layer is covered over with a protective release paper, 79, which is stripped at the time of application of the thermometer to the specimen bottle.

In a preferred embodiment the thermometer has a handle portion, 81, extending above the matrix, 80. The adhesive is applied to the face of the thermometer on the handle portion, 81, only. The thermometer is then adhered to the inside of the specimen bottle (not shown). This configuration permits a degree of circulation about the matrix area of the thermometer since it is not adhered to wall of the container.

Generally, specimen bottles are made of polypropylene and not glass. Hence, they are translucent rather than transparent. Under those circumstances the adhesive must be applied to the face of the thermometer so that it will be close to the wall through which it must be read. Where the specimen bottle is an open container, the thermometer of this invention can be deposited into the bottom of the container before filling with urine and read.

It will be appreciated by those skilled in the art that the thermometer of this invention may be utilized without adhering it to the face of the container. It may be deposited into the container without adhering to a wall of the container and read in the urine.

The selection of a particular indicating dye system in accordance with the practice of this invention can effect the compositional requirements in order to achieve the desired observed initiation of melt. For example where the indicating dye system is a mixture of bromcresol purple and ethyl red, (BP/ER) the compositional differences between the pinacyanol iodide and this mixed dye system are shown in Table V.

TABLE V

| Indicated Temperature | Pinacyanol Iodide | | Bromcresol Purple/Ethyl Red | |
|---|---|---|---|---|
| | % Bromo | % Chloro | % Bromo | % Chloro |
| 99.0° F. | 79.75 | 20.25 | 82.26 | 17.74 |
| 99.5° F. | 82.25 | 17.75 | 84.25 | 15.75 |
| 100.0° F. | 84.75 | 15.25 | 86.26 | 13.74 |
| 100.5° F. | 87.25 | 12.75 | 88.25 | 11.75 |

The data shown in Table V was obtained using about 0.035 wt. % and 0.01 wt. % ethyl red, the weight percent being based on the weight of OCBN/OBNB solid solution. The preferred range of mixtures of dyes for this dye system is about 0.032 to about 0.038 wt. % bromcresol purple and about 0.009 to about 0.011 wt. % ethyl red.

The observed color change for the BP/ER mixture in OCNB/OBNB occurs about 0.5° F higher than that for the pinacyanol iodide, but because the method described above was utilized to determine the observable temperature of melt data, both systems give the same observed initiation of melt as indicated by the color change. The result is that different compositional parameters are defined over the temperature range.

Not wishing to be bound by theory it is believed that the difference shown above is a result of the fact that the color change for the pinacyanol iodide is a solubility phenomenon while that for the bromcresol purple/ethyl red (BP/ER) mixture is a complex formation phenomenon. It is believed that the latter phenomenon requires a greater percentage of the OCNB/OBNB to be melted before a color change is observed.

Using the procedure described above a curve similar to curve 6B can be developed for the BP/ER dye system. It will lie intermediate to curves 6A and 6B, while the completion of melt curve will be substantially the same as curve 6A of FIG. 6.

In the practice of this invention the Offset is positive, and can be about 0.3° to about 1.9° F. For the pinacyanol iodide system using OCNB/OBNB as the solvent it is about 1.6° F. to about 1.75° F. For the BP/ER system in OCNB/OBNB it is about 1.0° F. to about 1.3° F. As has been pointed out above using the method described, it is not necessary to determine the Offset directly. Development of the data which results in the composition vs. temperature curves of FIG. 6 fortuitously results in the Offset value required.

It has surprisingly been found that the thermometer of this invention may be used as an axillary thermometer with minor modifications. An extrapolation of the data of Table IV permits the determinations of the compositions required to prepare a thermometer covering the clinical range of 96.0° to 104.5° F. However, it is necessary to correlate actual body core temperature to the axillary reading. The device is used by taping it under the arm of a patient to be monitored, and periodically reading the patient's temperature with the thermometer left in place.

What is claimed is:

1. A temperature-indicating device comprising a heat conducting carrier having at least one spaced regions defined therein to determine a like number of predetermined temperatures in a predetermined temperature range, said spaced regions containing a like number of different temperature indicating compositions therein, each a solid solution, said carrier having a transparent cover sheet means in sealing engagement therewith, and with a single solid solution being deposited in each of said regions and being associated with a single one of said predetermined temperatures, each temperature indicating composition exhibiting a sharp color change upon transition from a solid state to a liquid state, and consisting essentially of:
  (a) a solvent, said solvent being a temperature responsive composition adapted to change from a solid at substantially the predetermined temperature to a liquid state; and (b) an effective amount of at least one organic moiety dissolved in and inert towards said solvent to form a solid solution when the composition is in the solid state, and adapted to change the color of the composition visible to the naked eye upon the change in state at substantially the predetermined temperature when so dissolved, said organic moiety being selected from one of the groups consisting of:

(1) at least one of a Group III body of compounds consisting of pinacyanol iodide, quinaldine red, 1,1'-diethyl-2,2'-cyanine iodide, pinacyanol chloride, thionin, methylene blue, cresol red, chlorophe nol red, neutral red iodide, neutral red chloride, crystal violet, acridin orange, Toluidin Blue O TM, Orasol Orange RLN TM, Orasol Navy Blue TM, Irgalith Red PR TM, Fat Red BS TM, Xylene Cyanol FF TM, Rhodamine 6G TM, Rhodanine B TM, Irgalith Magenta TCB TM, irgalite pink TYNC TM, Toluidine Blue O, Savinyl Green B TM, Savinyl Blue RS TM, purpurin 3,3'-diethylthiadicarbocyanine iodide, cryptocyanine, Dicyanine A TM, Merocyanine 540 TM, 4-(p-ethoxyphenylazo)-m phenylene diamine monohydrochloride, Yellow Orange S TM, Chrysoidin C TM, fuchsin, aurintricarboxylic acid (ammonium salt), Victoria Blue R TM, Pyronin G TM, gallein, Erythrosin Yellow Blend TM, chlorophenol blue, bromophenol blue, bromocresol purple, Coriphosphine O TM, acriflavine, acridine orange, rhoduline violet, Alizarin Cyanin 2R TM, Alizarin Red S TM, alcannin, Aurantia, Direct Green G TM, Fast Red Salt 3GL TM, Fast Blue Salt BB TM, Fast Garnet Salt GBC TM, Carta Yellow G 180 o/o TM, murexide, Savinyl Blue GLS TM, phthalocyanine, Di Amingreen B TM, Alizarin Blue S, Celliton Blue Extra TM, neocyanine, Janus Green, dimethyl yellow, Fast Yellow, Methyl red sodium salt, Alizarin yellow R TM, Eriochrome Black T TM, Chromotrope 2R TM, Ponceau 6R TM, Brilliant Ponceau G/R/2R TM, chromolan yellow, Sudan Red B TM, Bismarck brown G TM, Fat Black TM, Resorcin Brown TM, Benzofast pink 2BL TM, Oil Red EGN TM, Euroglaucine, Fuchsin NB TM, parafuchsin, Patent Blue TM, Irgalith Blue TNC TM, Phloxin B TM, fluorescein sodium salt, Rhodamine B base TM, Eosin Scarlet, Esoin Yellowish TM, Erythrosin extra bluish 4,5-dibromofluorescein, ethyleosin, Phloxine TM, Cyanovin B TM, chlorocresol green, pinacyanol bromide, 2-(p-dimethylaminostyryl)-1-ethyl pryidinium iodide ethyl red, neutral red iodide, nigrosine, savinyl blue B TM, Orasol Blue BLN TM, Safranin O TM, Azocarnun G TM, Phenosafranine, Azocarmine BX TM, Solophenyl Brilliant Blue BL TM, Nile Blue A TM, gallocyanine, gallamine blue, celestine blue, methylene green, Azure A/B/C TM, Blue VIF Organol TM, Alizarin, Nitrofast Green GSB TM, quinalizarine, Oil Blue N TM, Solvay purple, Ciba Blue TM, Indigo synthetic TM, Chromophtal Bordeaux RS TM, Acid Alizarin Red B TM, 5-Aminofluorescein, Rose Bengal TM, Martius Yellow TM, Chicago Blue 6B TM, Alcian Blue 8GX TM, Cresyl violet, 4,4' Bis(dimethylamino)-benzylhdrol, Zinc Pthalocyanine, Sudan III TM, Pyronin TM, Toluylene Blue TM, cresyl violet perchlorate, Mendola's Blue TM, Phosphine Dye, Nitron TM, cresyl violet acetate, Ceres Orange R TM, 4-phenylazo-1-naphtyl-amine, 4-(4 Dimethylamino-1-n apthylazo)-3-methoxybenzene sulfonic acid, Bindschedler's Green TM, p-(p-dimethylaminophenylazo) benzoic acid;

(2) a binary mixture of:
(A) at least one of a Group I body of compounds soluble in said solvent consisting of the halogenated sulfonphthaleins and the organic acids having a $pK_1$ of less than or about four; and
(B) at least one of a Group II body of compounds consisting of the aminotriphenylmethane and their soluble salts, 8-hydroxyquinoline, and the cyanines;

with the proviso that if the Group II compounds consist solely of at least one aminotriphenylmethanes or their soluble salts, then the Group I compound must be selected from at least one of the group consisting of oxalic acid, suitable soluble sulfonic acids and the tetrahalogenated sulfonphthaleins, and the other soluble organic acids having a $pK_1$ of less than or about 2, and wherein the weight ratio of the Group I body of compounds to the Group II body of compounds is more than or about 3 to 1; and (3) at least one of the aforesaid Group III body of compounds with at least one of the Group I or Group II bodies of compounds;

the temperature indicating composition having incorporated therein a nucleating agent and such organic moiety, the temperature sensing composition being so selected as to have an observable initiation of melt which is used to indicate a predetermined temperature and a completion of melt temperature which is about 0.3° to about 1.9° F. greater than the observable initiation of melt temperature.

2. The device according to claim 1 wherein the solvent is selected from at least one of the group consisting of orthochloronitrobenzene, ortho-bromonitrobenzene, 1-thymol, 2-naphthol, 2-ethoxybenzamide, naphthalene, ortho-iodonitrobenzene, meta-iodonitrobenzene, para-iodonitrobenzene, para-dichloronitrobenzene, meta-bromonitrobenzene, para-dibromonitrobenzene, and partoluic acid.

3. The device according to claim 1 wherein the solvent is a binary mixture of ortho-chloronitrobenzene and orthobromonitrobenzene.

4. The device according to claim 3 wherein the binary mixture of ortho-chloronitrobenzene and ortho-bromonitrobenzene have weight percentage ratios of from about 82:18 to about 12:88.

5. The device according to claim 3 wherein the binary mixture of ortho-chloronitrobenzene and ortho-bromonitrobenzene have weight percentage ratios of from about 81.5:18.5 to about 12.75:87.25.

6. The device according to claim 1 wherein the solvent consists of varies amounts of para-dichlorobenzene and para-bromochlorobenzene.

7. The device according to claim 1 wherein the organic moiety is pinacyanol iodide.

8. The device according to claim 1 wherein the organic moiety is a mixture of bromcresol purple and ethyl red.

9. The device according to claim 1 wherein the organic moiety comprises a mixture of about 0.032 to about 0.038 wt. % bromcresol purple and about 0.009 to about 0.011 wt. % ethyl red.

10. The device according to claim 1 wherein the nucleating agent is anthraquinone.

11. The device according to claim 3 wherein the organic moiety is pinacyanol iodide, the temperature sensing composition having a completion of melt temperature of about 1.6° to about 1.75° F. greater than the observable initiation of melt temperature.

12. The device according to claim 1 wherein the organic moiety is a mixture of bromcresol purple and ethyl red.

13. The device according to claim 3 wherein the organic moiety is a mixture of bromcresol purple and ethyl red, the temperature sensing composition having a completion of melt temperature of about 1.6° to about 1.75° F. greater than the observable initiation of melt temperature.

14. The device according to claim 1 having a face displaying a matrix thereon with 20 separate spaced regions designated with predetermined temperatures ranging from 90.0 to 100.5, each spaced region containing a temperature indicating composition having an observable initiation of melt corresponding to the predetermined temperature designation.

15. The device according to claim 14 having at least a portion of said face covered with a pressure sensitive adhesive.

16. A method for measuring the temperature of a urine sample which comprises utilizing as a urine temperature measuring device, a temperature-indicating device comprising a heat conducting carrier having at least spaced regions defined therein to determine a like number of predetermined temperatures in a predetermined temperature range, said spaced regions containing a like number of different temperature indicating compositions therein, each a solid solution, said carrier having a transparent cover sheet means in sealing engagement therewith, and with a single solid solution being deposited in each of said regions and being associated with a single one of said predetermined temperatures, each temperature indicating composition exhibiting a sharp color change upon transition from a solid state to a liquid state, and consisting essentially of:
 (a) a solvent, said solvent being a temperature responsive composition adapted to change from a solid at substantially the predetermined temperature to a liquid state; and
 (b) an effective amount of at least one organic moiety dissolved in an inert towards said solvent to form a solid solution when the composition is in the solid state, and adapted to change the color of the composition visible to the naked eye upon the change in state at substantially the predetermined temperature when so dissolved, said organic moiety being selected from one of the groups consisting of:
  (1) at least one of a Group III body of compounds consisting of pinacyanol iodide, quinaldine red, 1,1'-diethyl-2,2'-cyanine iodide, pinacyanol chloride, thionin, methylene blue, cresol red, chlorophenol red, neutral red iodide, neutral red chloride, crystal violet, acridin orange, Toluidin Blue O TM, Orasol Orange RLN TM, Orasol Navy Blue TM, Irgalith Red PR TM, Fat Red BS TM, Xylene Cyanol FF TM, Rhodamine 6G TM, Rhodanine B TM, Irgalith Magenta TCB TM, irgalite pink TYNC TM, Toluidine Blue O, Savinyl Green R TM, Savinyl Blue RS TM, purpurin 3,3'-diethylthiadi carbocyanine iodide, cryptocyanine, Dicyanine A TM, Merocyanine 540 TM, 4-(p-ethoxyphenylazo)-m-phenylene diamine monohydrochloride, Yellow Orange S TM, Chrysoidin G TM, Fuchsin, aurintricarboxylic acid (ammonium salt), Victoria Blue R TM, Pyronin G TM, gallein, Erythrosin Yellow Blend TM, chlorophenol blue, bromophenol blue, bromocresol purple, Coriphosphine O TM, acriflavine, acridine orange, rhoduline violet, Alizarin Cyanin 2R TM, Alizarin Red S TM, alcannin, Aurantia, Direct Green G TM, Fast Red Salt 3GL TM, Fast Blue Salt BB TM, Fast Garnet Salt GBC TM, Carta Yellow G 180 o/o TM, murexide, Savinyl Blue GLS TM, phthalocyanine, Di Amingreen B TM, Alizarin Blue S, Celliton Blue Extra TM, neocyanine, Janus Green, dimethyl yellow, Fast Yellow, Methyl red sodium salt, Alizarin yellow R TM, Eriochrome Black T TM, Chromotrope 2R TM, Ponceau 6R TM, Brilliant Ponceau G/R/2R TM, chromolan yellow, Sudan Red B TM, Bismarck brown G TM, Fat Black TM, Resorcin Brown TM, Benzofast pink 2BL TM, Oil Red EGN TM, Euroglaucine, Fuchsin NB TM, parafuchsin, Patent Blue TM, Irgalith Blue TNC TM, Phloxin B TM, fluorescein sodium salt, Rhodamine B base TM, Eosin Scarlet, Esoin Yellowish TM, Erythrosin extra bluish 4,5-dibromoflucorescein, ethyleosin, Phloxine TM, Cyanovin B TM, chlorocresol green, pinacyanol bromide, 2-(p-dimethylaminostyryl)-1-ethyl pryidinium iodide ethyl red, neutral red iodide, nigrosine, savinyl blue B TM, Orasol Blue BLN TM, Safranin O TM, Azocarnun G TM, Phenosafranine, Azocarmine BX TM, Solophenyl Brilliant Blue BL TM, Nile Blue A TM, gallocyanine, gallamine blue, celestine blue, methylene green, Azure A/B/C TM, Blue VIF Organol TM, Alizarin, Nitrofast Green GSB TM, quinalizarine, Oil Blue N TM, Solvay purple, Ciba Blue TM, Indigo synthetic TM, Chromophtal Bordeaux RS TM, Acid Alizarin Red B TM, 5-Aminofluorescein, Rose Bengal TM, Martius Yellow TM, Chicago Blue 6B TM, Alcian Blue 8GX TM, Cresyl violet, 4,4'Bis(dimethylamino)-benzylhdrol, Zinc Pthalocyanine, Sudan III TM, Pyronin Y TM, Toluylene Blue TM, cresyl violet perchlorate, Mendola's Blue TM, Phosphine Dye, Nitron TM, cresyl violet acetate, Ceres Orange R TM, 4-phenylazo-1-naphtyl amine 4-(4-Dimethylamino-1-n apthylazo) 3 methoxybenzene sulfonic acid, Bindschedler's Green TM, p (p-dimethylaminophenylazo) benzoic acid;
 (2) a binary mixture of:
  (A) at least one of a Group I body of compounds soluble in said solvent consisting of the halogenated sulfonphthaleins and the organic acids having a $pK_1$ of less than or about four; and
  (B) at least one of a Group II body of compounds consisting of the aminotriphenylmethane and their soluble salts, 8 hydroxyquinoline, and the cyanines;
  with the proviso that if the Group II compounds consist solely of at least one aminotriphenylmethanes or their soluble salts, then the Group I compound must be selected from at least one of the group consisting of oxalic acid, suitable soluble sulfonic acids and the tetrahalogenated sulfonphthaleins, and the other soluble organic acids having a pK$_1$ of less than or about 2, and wherein the weight ratio of the Group I body of compounds to the Group II body of compounds is more than or about 3 to 1; and (3) at least one of the aforesaid Group III body of compounds with at least one of the Group I or Group II bodies of compounds;

the temperature indicating composition having incorporated therein a nucleating agent and such organic moiety, the temperature sensing composition being so selected as to have an observable initiation of melt which is used to indicate a predetermined temperature and a completion of melt temperature which is about 0.3° to about 1.9° F. greater than the observable initiation of melt temperature;

said device having a face displaying a matrix thereon with 20 separate spaced regions designated with predetermined temperatures ranging from 90.0° to 100.5° F., each spaced region containing a temperature indicating composition having an observable initiation of melt corresponding to the predetermined temperature designation; said device having at least a portion of said face covered with a pressure sensitive adhesive; adhering said device to an inside face of a urine specimen container, filling the container with sufficient urine sample to cover at least the matrix area of the device, and reading the observed temperature.

17. A method for measuring the temperature of a urine sample which comprises utilizing as a urine temperature measuring device, a temperature-indicating device comprising a heat conducting carrier having at least one spaced regions defined therein to determine a like number of predetermined temperatures in a predetermined temperature range, said spaced regions containing a like number of different temperature indicating compositions therein, each a solid solution, said carrier having a transparent cover sheet means in sealing engagement therewith, and with a single solid solution being deposited in each of said regions and being associated with a single one of said predetermined temperatures, each temperature indicating composition exhibiting a sharp color change upon transition from a solid state to a liquid state, and consisting essentially of:

(a) a solvent, said solvent being a temperature responsive composition adapted to change from a solid at substantially the predetermined temperature to a liquid state; and (b) an effective amount of at least one organic moiety dissolved in and inert towards said solvent to form a solid solution when the composition is in the solid state, and adapted to change the color of the composition visible to the naked eye upon the change in state at substantially the predetermined temperature when so dissolved, said organic moiety being selected from one of the groups consisting of:

(1) at least one of a Group III body of compounds consisting of pinacyanol iodide, quinaldine red, 1,1'-diethyl-2,2'-cyanine iodide, pinacyanol chloride, thionin, methylene blue, cresol red, chlorophenol red, neutral red iodide, neutral red chloride, crystal violet, acridin orange, Toluidin Blue O TM, Orasol Orange RLN TM, Orasol Navy Blue TM, Irgalith Red PR TM, Fat Red BS TM, Xylene Cyanol FF TM, Rhodamine 6G TM, Rhodanine B TM, Irgalith Magenta TCB TM, irgalite pink TYNC TM, Toluidine Blue O, Savinyl Green B TM, Savinyl Blue RS TM, purpurin 3,3'-diethylthiadicarbocyanine iodide, cryptocyanine, Dicyanine A TM, Merocyanine 540', 4-(p-ethoxyphenylazo)-m-phenylene diamine monohydrochloride, Yellow Orange S TM, Chrysoidin G TM, fuchsin, aurintricarboxylic acid (ammonium salt), Victoria Blue R TM, Pyronin G TM, gallein, Erythrosin Yellow Blend TM, chlorophenol blue, bromophenol blue, bromocresol purple, Coriphosphine O TM, acriflavine, acridine orange, rhoduline violet, Alizarin Cyanin 2R TM, Alizarin Red S TM, alcannin, Aurantia, Direct Green G TM, Fast Red Salt 3GL TM, Fast Blue Salt BB TM, Fast Garnet Salt GBC TM, Carta Yellow G 180 o/o TM, murexide, Savinyl Blue GLS TM, phthalocyanine, Di Amingreen B TM, Alizarin Blue S, Celliton Blue Extra TM, neocyanine, Janus Green, dimethyl yellow, Fast Yellow, Methyl red sodium salt, Alizarin yellow R TM, Eriochrome Black T TM, Chromotrope 2R TM, Ponceau 6R TM, Brilliant Ponceau G/R/2R TM, chromolan yellow, Sudan Red B TM, Bismarck brown G TM, Fat Black TM, Resorcin Brown TM, Benzofast pink 2BL TM, Oil Red EGN TM, Euroglaucine, Fuchsin NB TM, parafuchsin, Patent Blue TM, Irgalith Blue TNC TM, Phloxin B TM, fluorescein sodium salt, Rhodamine B base TM, Eosin Scarlet, Esoin Yellowish TM, Erythrosin extra bluish 4,5-dibromoflucorescein, ethyleosin, Phloxine TM, Cyanovin B TM, chlorocresol green, pinacyanol bromide, 2-(p-dimethylaminostyryl)-1-ethyl pryidinium iodide ethyl red, neutral red iodide, nigrosine, savinyl blue B TM, Orasol Blue BLN TM, Safranin O TM, Azocarnun G TM, Phenosafranine, Azocarmine BX TM, Solophenyl Brilliant Blue BL TM, Nile Blue A TM, gallocyanine, gallamine blue, celestine blue, methylene green, Azure A/B/C TM, Blue VIF Organol TM, Alizarin, Nitrofast Green GSB TM, quinalizarine, Oil Blue N TM, Solvay purple, Ciba Blue TM, indigo synthetic TM, Chromophtal Bordeaux RS TM, Acid Alizarin Red B TM, 5-Aminofluorescein, Rose Bengal TM, Martius Yellow TM, Chicago Blue 6B TM, Alcian Blue 8GX TM, Cresyl violet, 4,4' Bis(dimethylamino)-benzylhdrol, Zinc Pthalocyanine, Sudan III TM, Pyronin Y TM, Toluylene Blue TM, cresyl violet perchlorate, Mendola's Blue TM, Phosphine Dye, Nitron TM, cresyl violet acetate, Ceres Orange R TM, 4-phenylazo 1 naphtyl-amine, 4-(4-Dimethylamino-1-n apthylazo)-3-methoxybenzene sulfonic acid, Bindschedler's Green TM, p (p dimethylaminophenylazo) benzoic acid;

(2) a binary mixture of:

(A) at least one of a Group I body of compounds soluble in said solvent consisting of the halogenated sulfonphthaleins and the organic acids having a pK$_1$ of less than or about four; and (B) at least one of a Group II body of compounds consisting of the aminotriphenylmethane and their soluble salts, 8 hydroxyquinoline, and the cyanines;

with the proviso that if the Group II compounds consist solely of at least one aminotriphenylmethanes or their soluble salts, then the Group I compound must be selected from at least one of the group consisting of oxalic acid, suitable soluble sulfonic acids and the tetrahalogenated sulfonphthaleins, and the other soluble organic acids having a $pK_1$ of less than or about 2, and wherein the weight ratio of the Group I body of compounds to the Group II body of compounds is more than or about 3 to 1; and (3) at least one of the aforesaid Group III body of compounds with at least one of the Group I or Group II bodies of compounds;

the temperature indicating composition having incorporated therein a nucleating agent and such organic moiety, the temperature sensing composition being so selected as to have an observable initiation of melt which is used to indicate a predetermined temperature and a completion of melt temperature which is about 0.3° to about 1.9° F. greater than the observable initiation of melt temperature;

said device having a face displaying a matrix thereon with 20 separate spaced regions designated with predetermined temperatures ranging from 90.0° to 100.5° F., each spaced region containing a temperature indicting composition having an observable initiation of melt corresponding to the predetermined temperature designation; said device having at least a portion of said face covered with a pressure sensitive adhesive;

depositing the device into a urine specimen container, filling the container with sufficient urine sample to cover at least the matrix area of the device, and reading the urine temperature.

* * * * *